United States Patent
Shaik

(10) Patent No.: US 7,721,222 B1
(45) Date of Patent: May 18, 2010

(54) DYNAMIC LANGUAGE TEXT GENERATION SYSTEM AND METHOD

(76) Inventor: Cheman Shaik, 102 Sattar Residency, H. No. 12-2-39/3, Migh Colony, Murad Nagar, Mehdipatnam, Hyderabad-500028 (IN)

( * ) Notice: Subject to any disclaimer, the term of this patent is extended or adjusted under 35 U.S.C. 154(b) by 0 days.

(21) Appl. No.: 12/481,729

(22) Filed: Jun. 10, 2009

(51) Int. Cl.
*G06F 3/048* (2006.01)

(52) U.S. Cl. ........................ 715/773; 715/703; 715/810; 715/843; 715/827; 715/234; 345/156

(58) Field of Classification Search ................ 715/703, 715/773, 810–827, 843, 234; 345/156; 3/703, 3/773, 810–827, 843, 234
See application file for complete search history.

(56) References Cited

U.S. PATENT DOCUMENTS

| | | | | |
|---|---|---|---|---|
| 4,498,143 | A | 2/1985 | Strzelecki | 715/263 |
| 4,502,128 | A | 2/1985 | Okajima | 704/8 |
| 5,319,386 | A | 6/1994 | Gunn | 345/173 |
| 5,410,306 | A | 4/1995 | Ye | 341/28 |
| 6,002,390 | A * | 12/1999 | Masui | 345/173 |
| 6,011,546 | A | 1/2000 | Bertram | 345/327 |
| 6,344,865 | B1 | 2/2002 | Matthews, III | 345/815 |
| 6,377,966 | B1 | 4/2002 | Cooper | 715/263 |
| 6,388,686 | B1 | 5/2002 | Hetherington | 345/810 |
| 6,549,220 | B1 | 4/2003 | Hsu | 345/854 |
| 6,562,078 | B1 | 5/2003 | Yang | 715/202 |
| 6,809,725 | B1 * | 10/2004 | Zhang | 345/171 |
| 7,061,403 | B2 * | 6/2006 | Fux | 341/28 |
| 7,136,803 | B2 | 11/2006 | Kida | 704/3 |
| 7,254,784 | B2 | 8/2007 | Chang | 707/102 |
| 7,257,528 | B1 * | 8/2007 | Ritchie et al. | 704/7 |
| 7,414,616 | B2 | 8/2008 | Jayachandra | 345/171 |
| 7,420,543 | B2 | 9/2008 | Jayachandra | 345/171 |
| 7,464,024 | B2 | 12/2008 | Luo | 704/9 |
| 2001/0026291 | A1 | 10/2001 | Uchida | 345/810 |
| 2002/0168208 | A1 * | 11/2002 | Lee | 400/484 |
| 2003/0088398 | A1 * | 5/2003 | Guo et al. | 704/8 |
| 2004/0150670 | A1 * | 8/2004 | Feldman et al. | 345/781 |
| 2005/0010877 | A1 | 1/2005 | Udler | 715/826 |
| 2005/0057512 | A1 * | 3/2005 | Du et al. | 345/168 |
| 2005/0066291 | A1 | 3/2005 | Lewak | 715/810 |
| 2005/0099408 | A1 * | 5/2005 | Seto et al. | 345/179 |
| 2005/0125741 | A1 * | 6/2005 | Clow et al. | 715/794 |
| 2005/0195171 | A1 * | 9/2005 | Aoki et al. | 345/172 |
| 2005/0248546 | A1 * | 11/2005 | Kong | 345/173 |
| 2006/0007157 | A1 * | 1/2006 | Li et al. | 345/168 |
| 2006/0265652 | A1 | 11/2006 | Seitz | 715/703 |
| 2007/0016572 | A1 * | 1/2007 | Bates et al. | 707/5 |

(Continued)

*Primary Examiner*—Weilun Lo
*Assistant Examiner*—Tuyetlien T Tran
(74) *Attorney, Agent, or Firm*—Walter J. Tencza, Jr.

(57) ABSTRACT

A non-English text generation system and method is presented by which text can be generated in any language without a keyboard. Initially, only a few base characters or radicals of a language are displayed. A desired character or derivative symbol is reached by lookup through successive menus. When a desired character or symbol is reached, it can be displayed on a computer monitor using a computer mouse or a similar interactive device. This system and method can be applied to any non-English language such as Chinese, Japanese, Korean, Indian, That, Lao, etc. The system and method has significant utility in internet searching, authentication, email, chat, wireless messaging, document preparation, online advertisement creation, form filling in e-commerce etc, in non-English languages.

19 Claims, 27 Drawing Sheets

U.S. PATENT DOCUMENTS

| | | | |
|---|---|---|---|
| 2007/0156394 A1* | 7/2007 | Banerjee et al. | 704/10 |
| 2007/0174771 A1* | 7/2007 | Mistry | 715/703 |
| 2008/0072175 A1 | 3/2008 | Corbett | 715/810 |
| 2008/0120541 A1* | 5/2008 | Cheng | 715/269 |
| 2009/0037837 A1* | 2/2009 | Raghunath et al. | 715/773 |
| 2009/0070098 A1* | 3/2009 | Patryshev | 704/3 |
| 2009/0183117 A1 | 7/2009 | Chang | 715/810 |
| 2009/0210815 A1* | 8/2009 | Cheng et al. | 715/773 |
| 2009/0225034 A1* | 9/2009 | Kida et al. | 345/171 |
| 2009/0225041 A1* | 9/2009 | Kida et al. | 345/173 |
| 2009/0228832 A1 | 9/2009 | Cheng | 715/810 |
| 2009/0265669 A1* | 10/2009 | Kida et al. | 715/863 |
| 2009/0307578 A1* | 12/2009 | Wei | 715/227 |

* cited by examiner

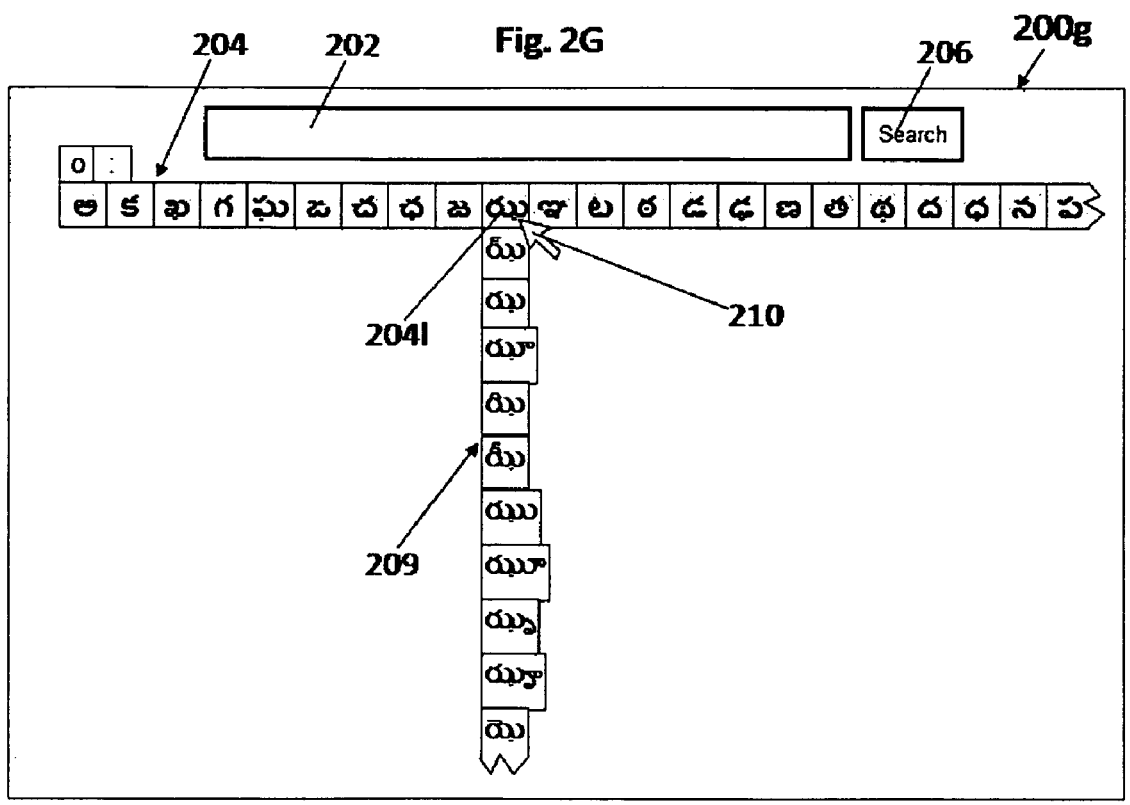

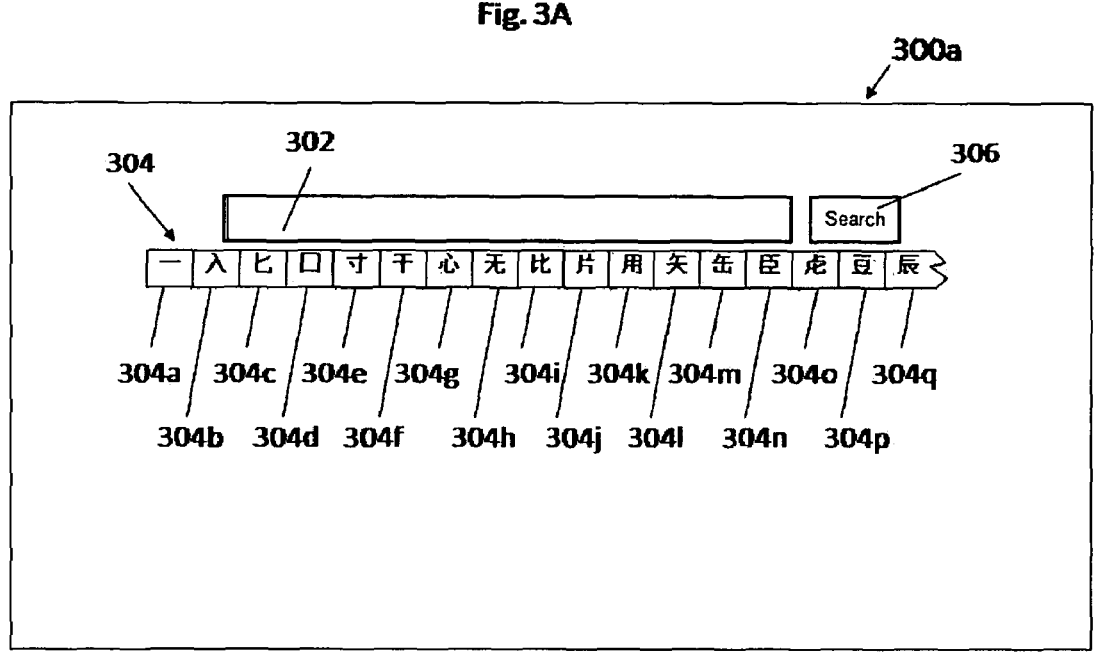

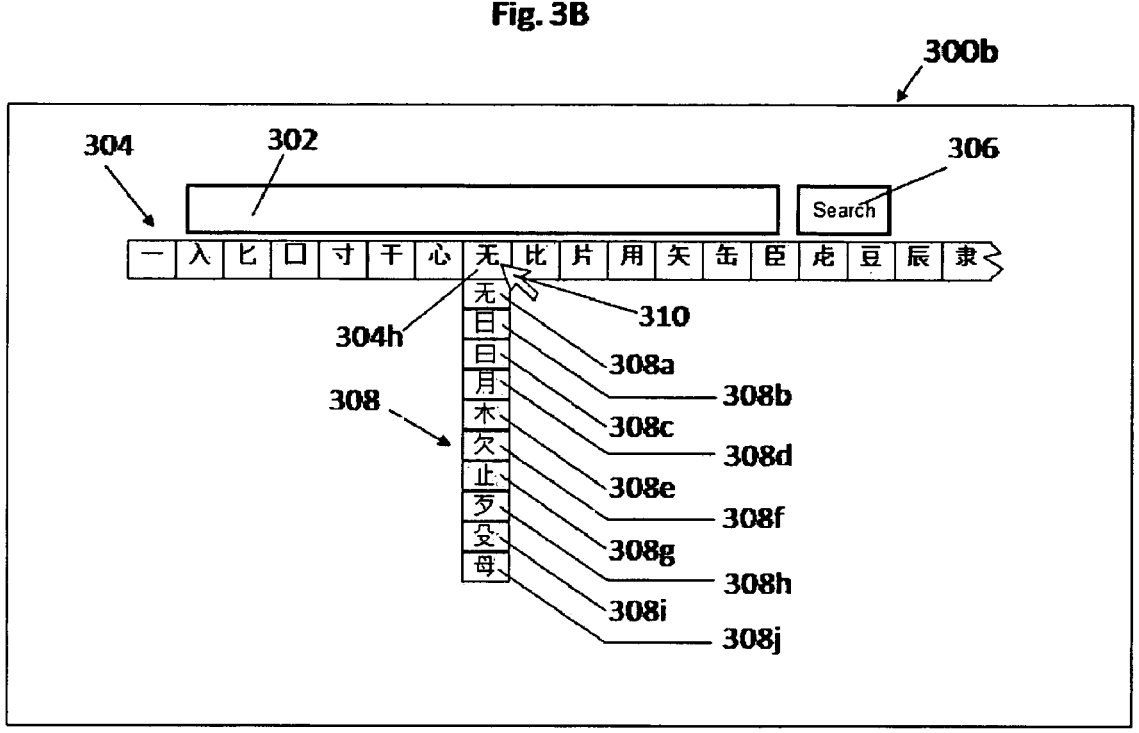

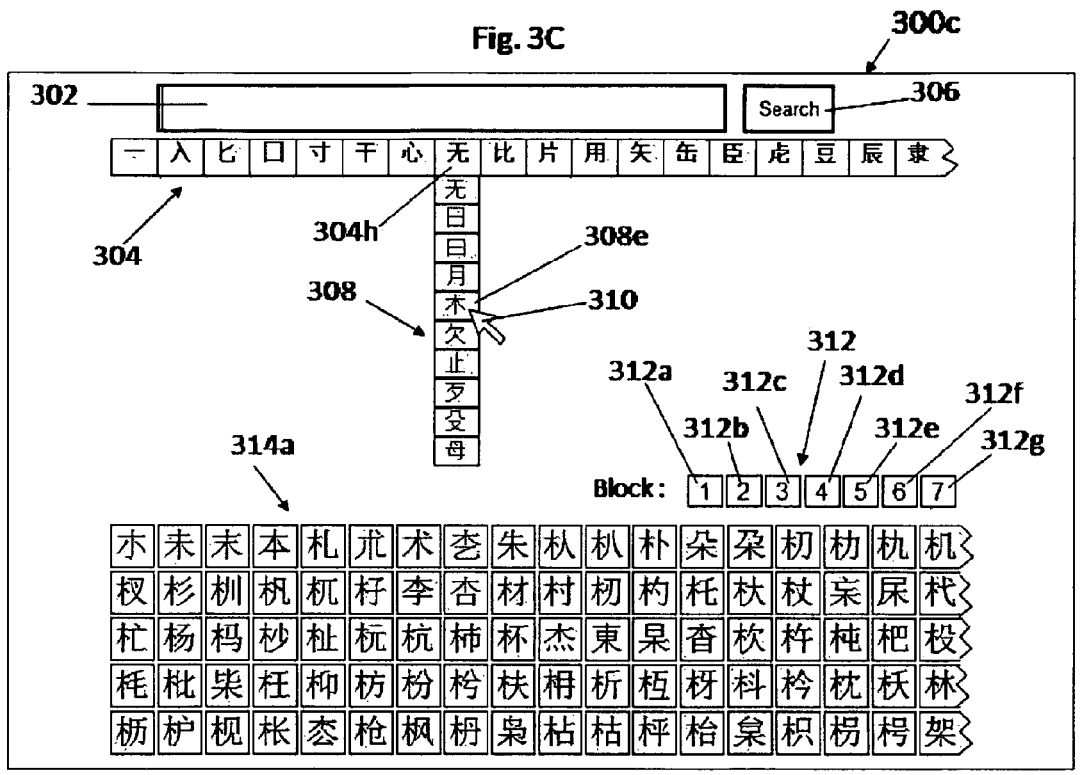

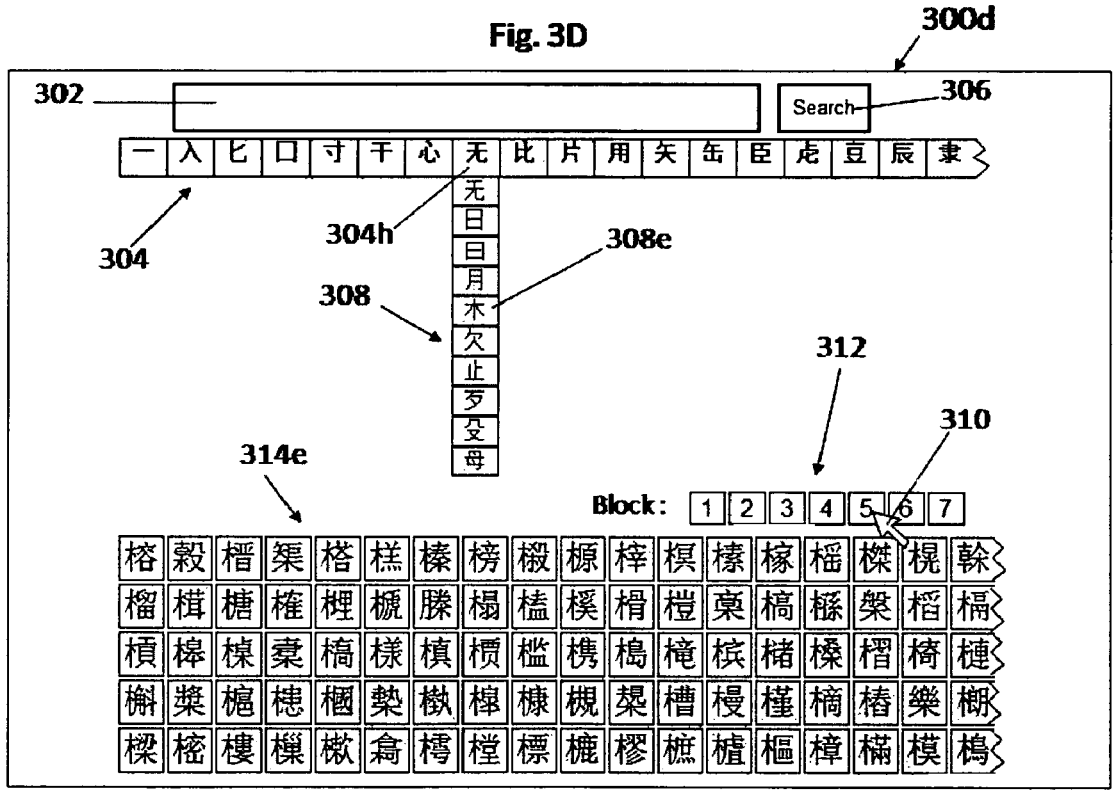

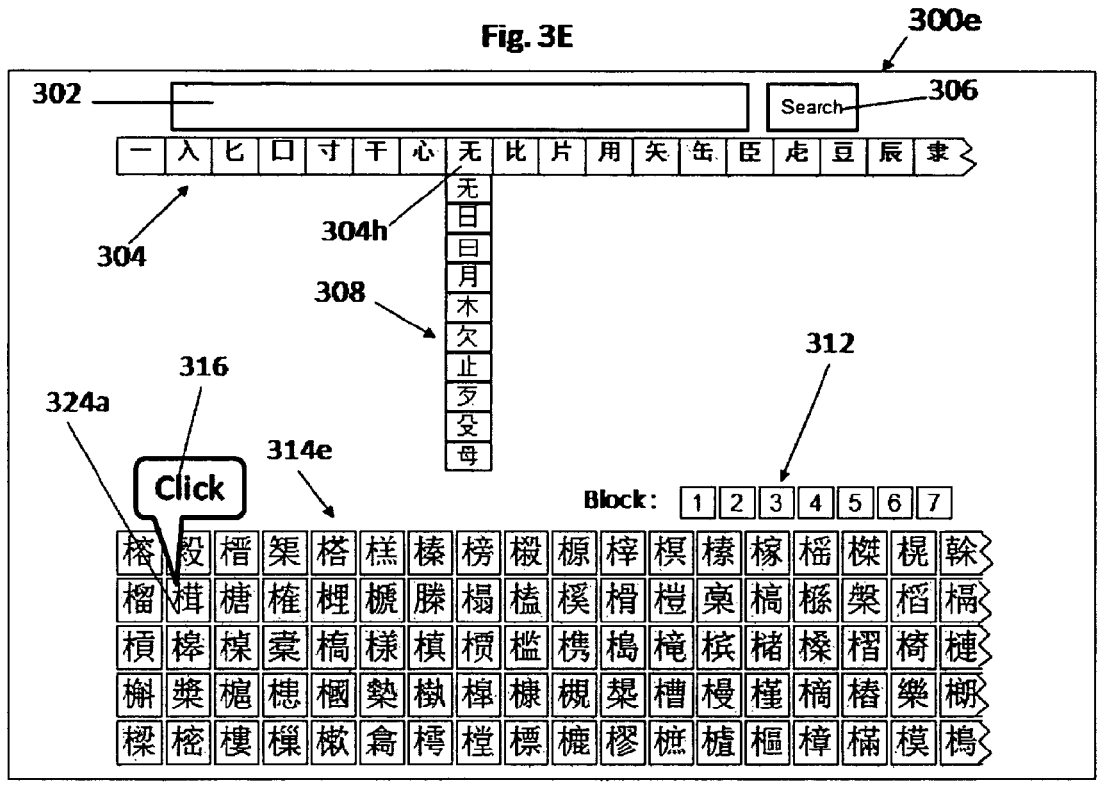

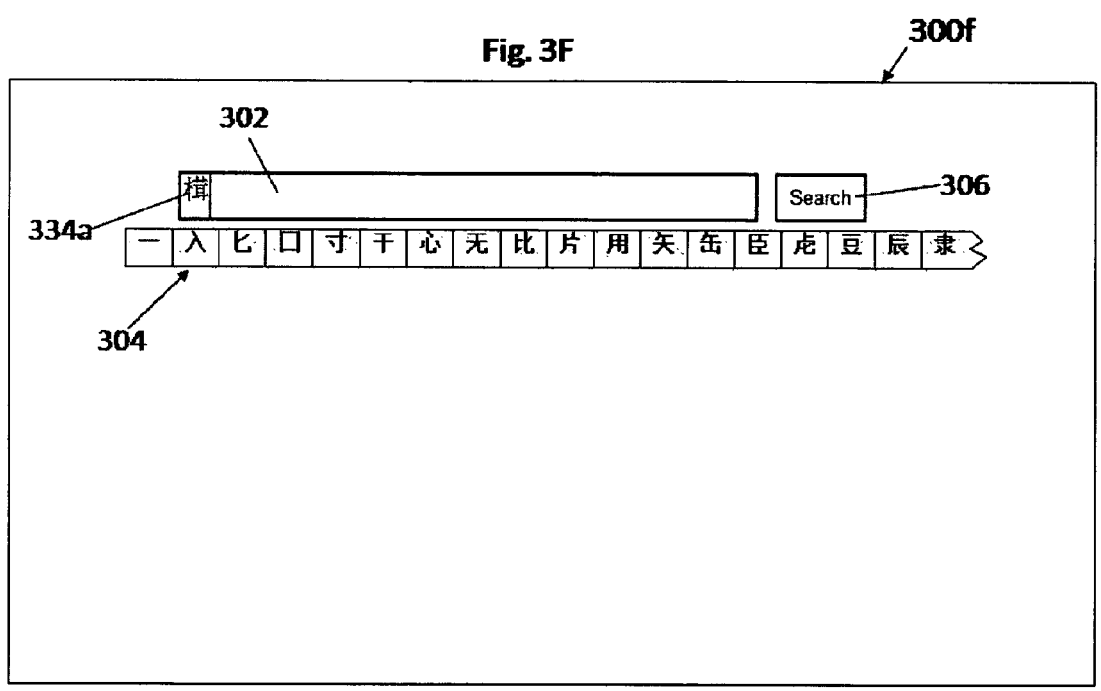

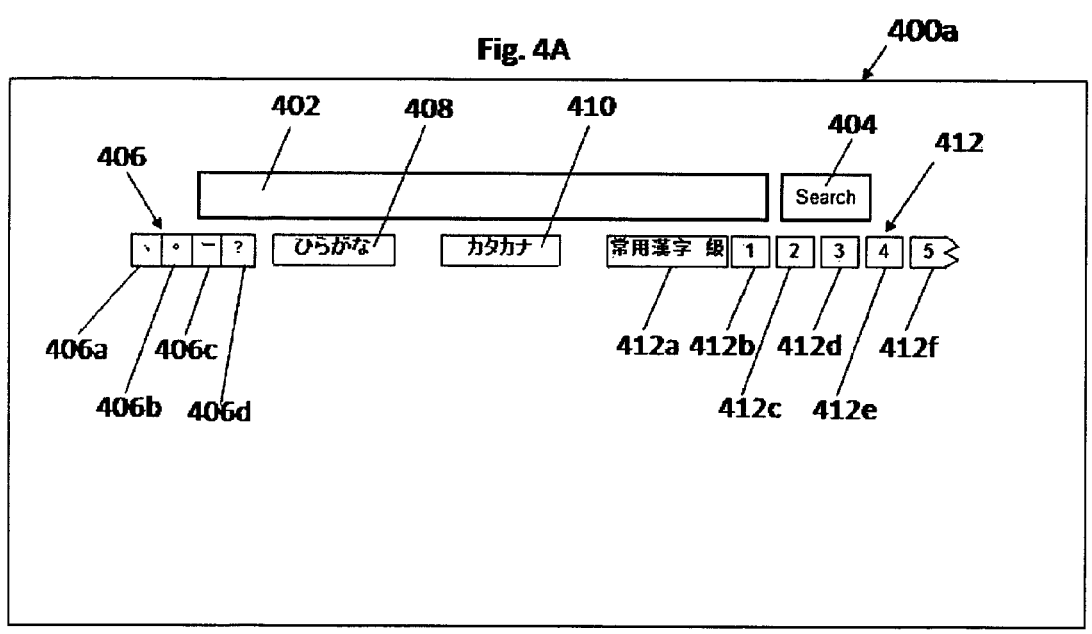

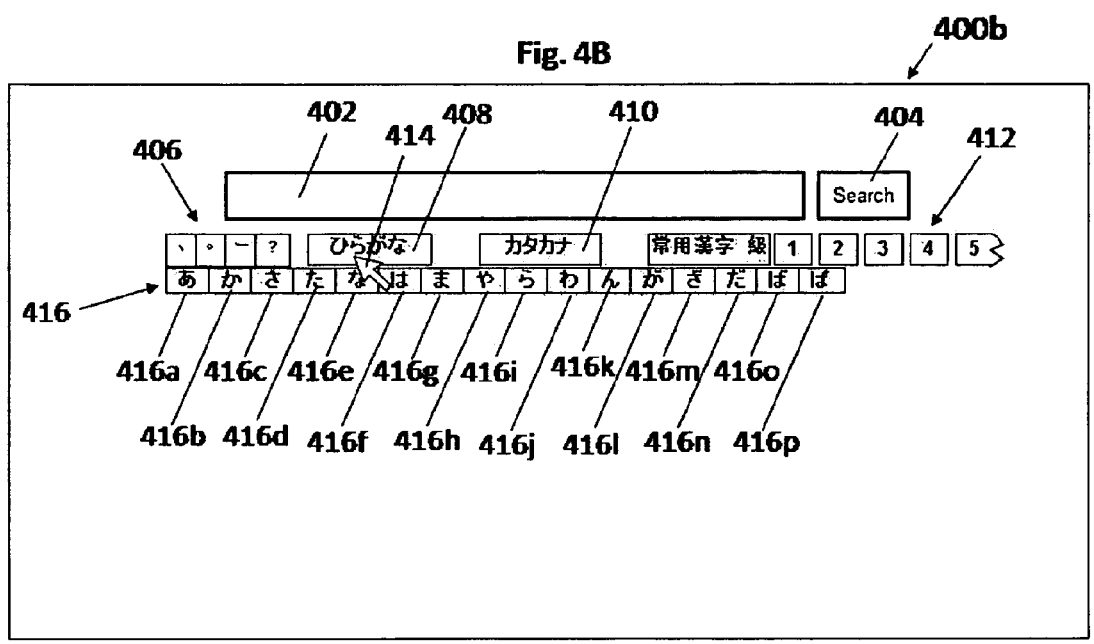

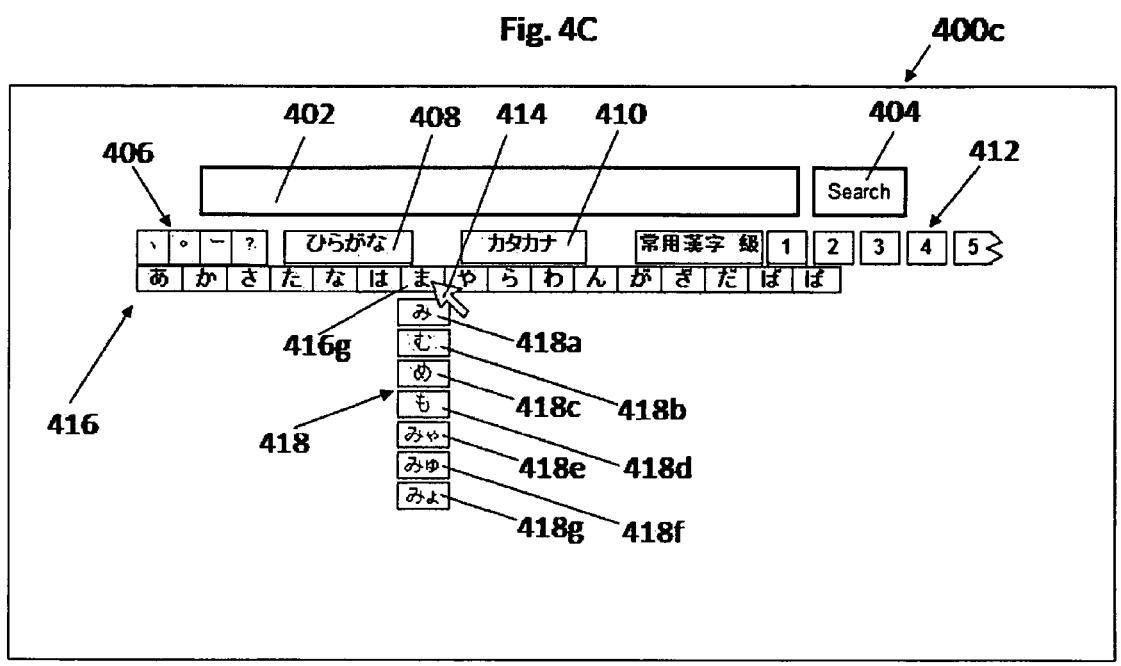

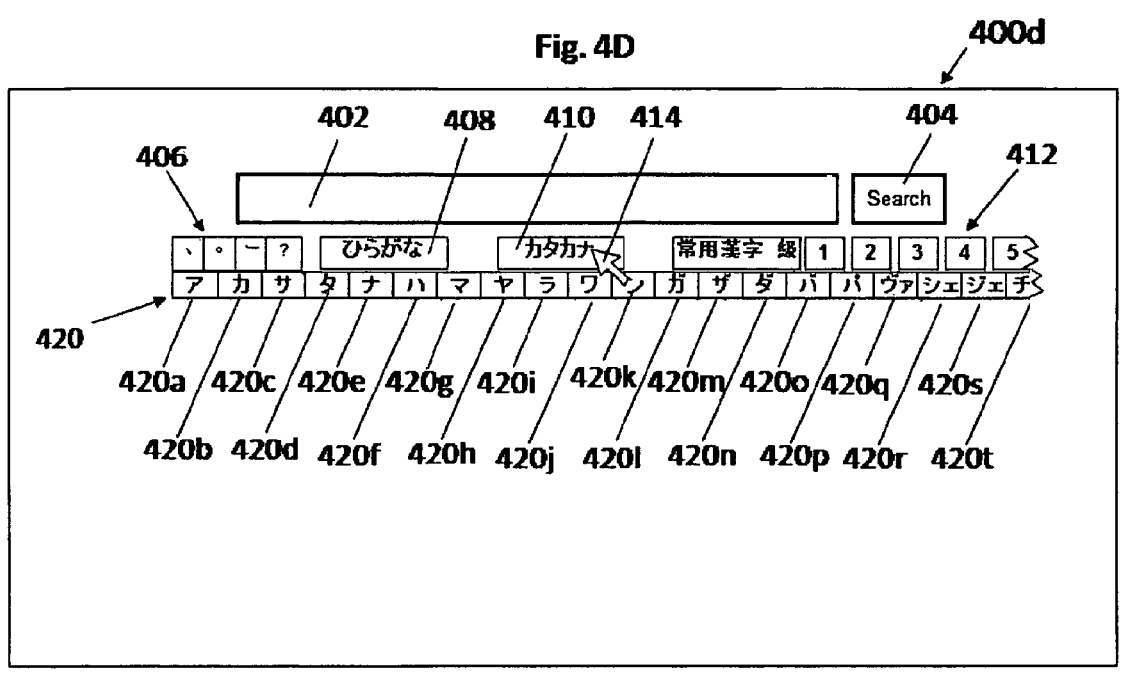

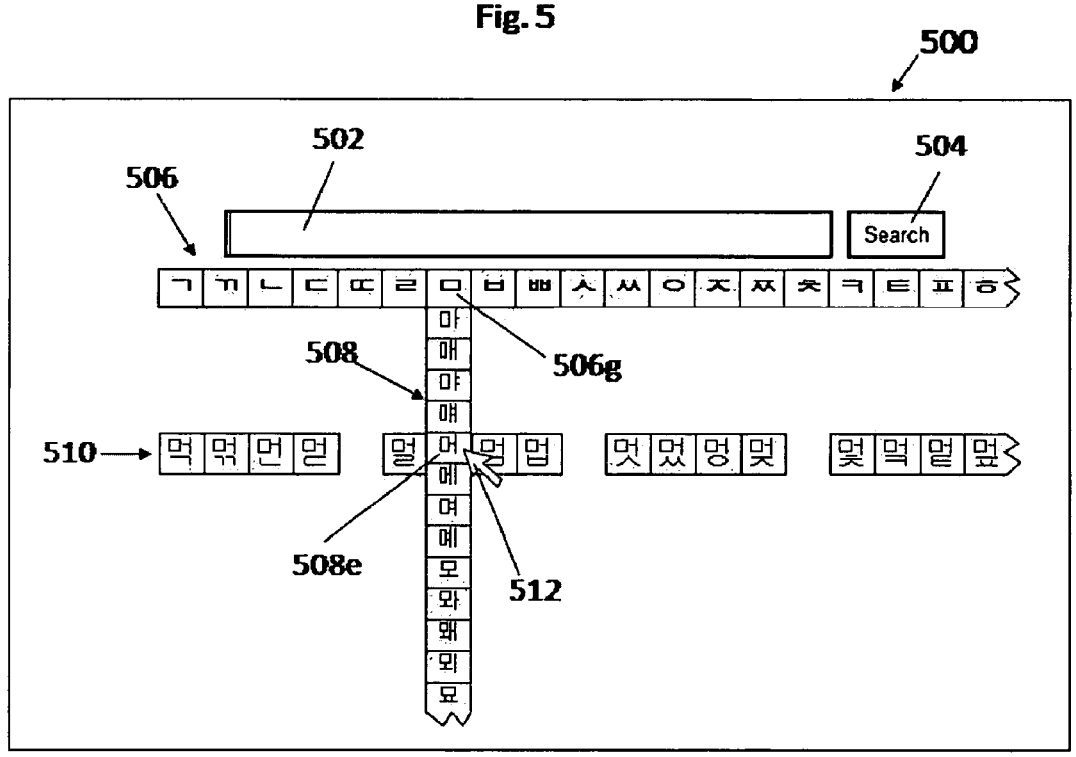

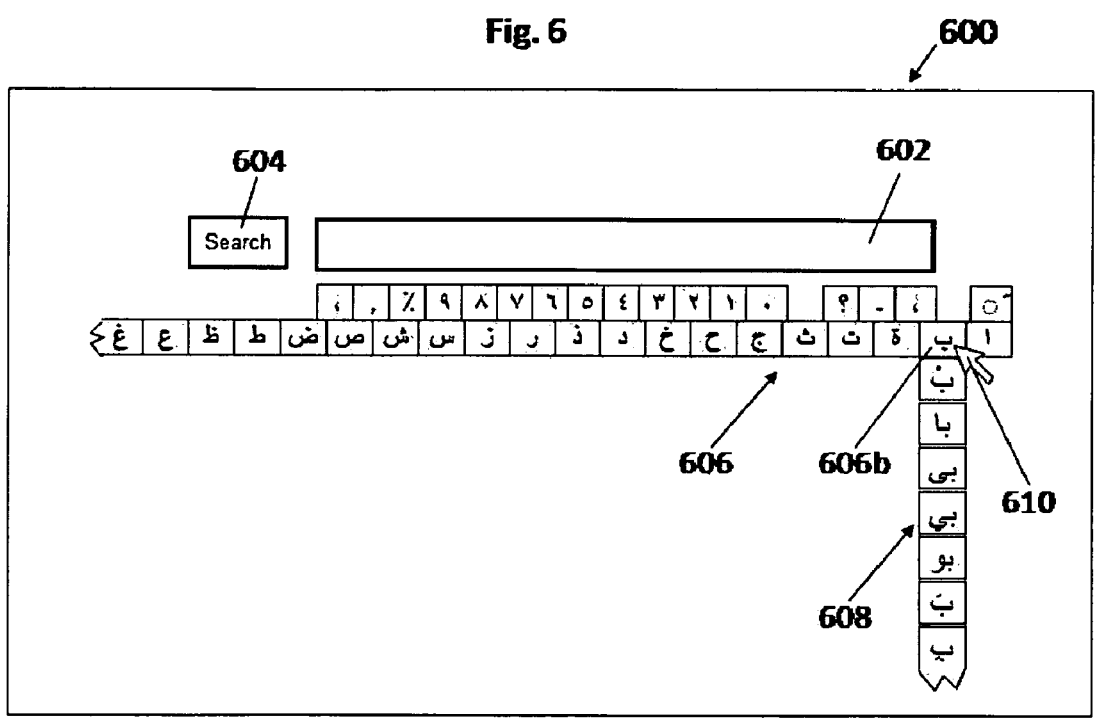

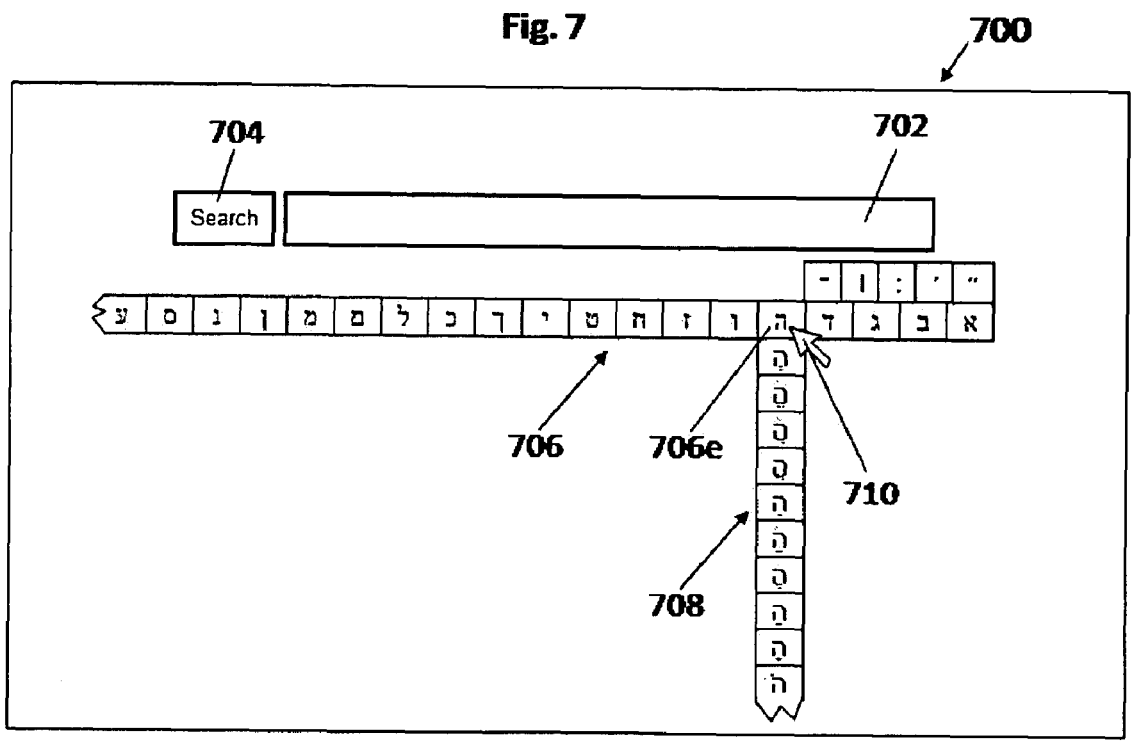

DYNAMIC LANGUAGE TEXT GENERATION SYSTEM AND METHOD

FIELD OF THE INVENTION

This invention relates to improved methods and apparatus concerning the generation of language text or characters.

BACKGROUND OF THE INVENTION

Generating text in non-English languages is a challenging task, especially for Asian languages such as Chinese, Japanese, Korean, That, Lao, Thaana, and Indian. Particularly in online HTML (Hyper Text Markup Language) forms, text generation for the aforementioned languages makes the page size too big to be accessed via the Internet as it requires several thousand characters to be defined in the HTML code. For example, Hindi, the national language of India, has more than one million characters that can be generated by several combinations of conjunct consonants, vowel signs and modifiers.

On the other hand, Chinese, which is a symbolic language, has several thousand symbols. These symbols are derivatives of the 214 Chinese base radicals. The derivative patterns are not the same for all the base radicals, unlike the vowel patterns of Indian languages. Incorporating these myriad conjunct characters or derivative symbols in a web page makes the page too large and impractical to be loaded from a web server to its client via the Internet, taking several minutes to hours.

Another interesting observation is that Japanese has three alphabets, Hiragana, Katakana and Kanji. While Hiragana is used for writing the native Japanese words. Katakana is used for writing foreign names and words. Kanji is a character set imported from the Chinese language. A typical Japanese text is written using all the three alphabets.

Text generation in non-English languages is necessary to search web pages in those languages on the Internet and intranet. There are several web sites on the Internet in non-English languages, especially Chinese, Japanese, Korean, Arabic, Russian, European and Indian languages.

Some websites on the Internet enable visitors to generate non-English text through transliteration (See a transliteration facility in the Telugu language on the web at url http://old.quilpad.in/telugu/). Transliteration is the technique of transcribing a word or text written in English into another language. Often transliteration for Indian languages generates inaccurate text and requires a lot of trial and error adjustments due to ambiguities in character mapping between English and the target language. For example, Tamil, a south Indian language has three characters that map to the English letter 'L'. Similarly, there are three characters in Tamil representing the English letter 'N'.

Indian languages have more consonants than English, resulting in ambiguities in mapping. Also, the vowel signs in Indian languages cannot be produced exactly with English vowel combinations unless a transliteration guide on a website is thoroughly studied.

Another drawback with transliteration is its implementation is very difficult and inaccurate for Mandarin Chinese and the Kanji part of Japanese as these scripts are not alphabet based but symbol based. In Chinese and Japanese Kanji, each symbol represents a word or a set of words.

Another means of generating non-English text is translation, wherein words typed in English are translated into the desired language. However, translation has its own limitations. It is not useful for those who are not proficient enough in English. Some words may be native to a particular language and may not even have their equivalents in English. Some times an English word may have more than one equivalent in other languages.

There are also some websites providing virtual key boards for generating text in non-English languages. For example, www.guruji.com is one such website providing a virtual key board in the Telugu language at the url http://www.guruji.com/te/index.html. However, the virtual key board of this prior art web site requires as many as six mouse clicks to generate a triple-consonant conjunct character in the Telugu language, which is a tedious job for a user. Another website, at the url http://www.search.webdunia.com/telugu.html, also provides a virtual keyboard which requires many mouse clicks to generate a triple-consonant conjunct character in the Telugu language.

A url on the web http://www.lookera.com/base/keyboards/chinese-keyboard.php provides a virtual key board in the Chinese language. However, it requires multiple mouse clicks and page scrolls to generate a typical Chinese character. Also, a couple of urls on the web http://www.gate2home.com/ and http://www.virtualkeyboard.ws/ provide virtual key boards in different languages, but these keyboards do not enable to generate characters with single mouse clicks in non-English languages such as Chinese, Japanese, Korean etc.

SUMMARY OF THE INVENTION

One or more embodiments of the present invention relate to a text generation system and method in non-English languages using Dynamic Language Menu Pads (DLMP), which can be used for internet searching, e-mail, chat, web-based authentication, document preparation, electronic form filling, online advertisement creation, wireless messaging, blogging, commenting on social networks etc. One or more embodiments of the present invention eliminate dependency on language specific keyboards, fonts, separate client installations, tool downloads, shortcut key settings etc. In one or more embodiments, text can be generated in any language just through mouse clicks or user actions through a computer interactive device.

One or more embodiments of the present invention provide an easy and practical approach to generating non-English text by generating letters of a non-English language using the desired language's own alphabet or symbols through dynamic generation of characters. This approach will avoid multiple mouse clicks, page scrolls, ambiguities, dependency on English, and the requirement of a huge database of words for different languages and their English mappings for translation.

In at least one or more embodiments of the present invention a method is provided including displaying on a computer monitor a first set of a plurality of character menu items. Each character menu item of the first set of the plurality of character menu items has a character of a language, such as a written language. Each character menu item of the first set of the plurality of character menu items is displayed in a first location on the computer monitor. The method may further include receiving a first user selection of a first character menu item of the first set of the plurality of character menu items, wherein the first user selection is received via a computer interactive device, and displaying a character of the language of the first character menu item in a second location on the computer monitor in response to receiving the first user selection.

The first set of the plurality of character menu items may be displayed in a row in the first location of the computer monitor. The language may be a non-English language. Each of the character menu items of the first set of the plurality of character menu items may have any one of a consonant character, a vowel, a base radical, a symbol, a lower case letter, an alphabet name, a digit, a block number, and a punctuation character of the language.

In another embodiment of the present invention a method is provided including displaying on a computer monitor a first set of a plurality of character menu items, wherein each character menu item of the first set of the plurality of character menu items has a character of a language. Each character menu item of the first set of the plurality of character menu items may be displayed in a first location on the computer monitor. The method may further include receiving a first user selection of a first character menu item of the first set of the plurality of character menu items, wherein the first user selection is received via a computer interactive device. In response to the first user selection, a second set of the plurality of character menu items may be displayed on the computer monitor. The second set of the plurality of character menu items are related to the first character menu item, wherein each character menu item of the second set of the plurality of character menu items has a character of the language. Each character menu item of the second set of the plurality of character menu items may be displayed in a second location on the computer monitor.

The method may further include receiving a second user selection of a second character menu item of the second set of the plurality of character menu items, wherein the second user selection is received via a computer interactive device. In response to the second user selection, a third set of the plurality of character menu items may be displayed on the computer monitor, wherein the plurality of character menu items of the third set of the plurality of character menu items are related to the second character menu item. Each character menu item of the third set of the plurality of character menu items may have a character of the language. Each character menu item of the third set of the plurality of character menu items may be displayed in a third location on the computer monitor.

The method may further include receiving a third user selection of a third character menu item of the third set of the plurality of character menu items, wherein the third user selection is received via a computer interactive device. In response to the third user selection, a fourth set of the plurality of character menu items may be displayed on the computer monitor, wherein the character menu items of the fourth set of the plurality of character menu items are related to the third character menu item. Each character menu item of the fourth set of the plurality of character menu items may be a character of the language. The character menu item of the fourth set of the plurality of character menu items may be displayed in a fourth location on the computer monitor.

The first user selection may be received from any one of a computer mouse, a computer touch screen, a finger pad of a laptop computer, and a computer keyboard. The first user selection may be received via a computer mobile device or a computer stylus on a computer mobile device. The first set of the plurality of character menu items may be displayed in a row in the first location of the computer monitor. The second set of the plurality of character menu items may be displayed in any one of a column, a row, and a block in the second location of the computer monitor. The third set of the plurality of character menu items may be displayed in any one of a column, a row, and a block in the third location of the computer monitor. The fourth set of the plurality of character menu items may be displayed in any one of a row, and a block in the fourth location of the computer monitor.

Each of the character menu items may be any one of an html table cell, a button, and a graphic user interface component. A method in accordance with embodiments of the present invention may include using the character of the language of the first character menu item for any one of searching on the internet, sending email, chatting, commenting on social networks, blogging, online advertisement creation, and document creation.

Each of the character menu items of the first set of the plurality of character menu items may have any one of a consonant character, a vowel, a base radical, a first symbol, a lower case letter, an alphabet name, a digit, a block number, and a punctuation character of the language. Each of the character menu items of the second set of the plurality of character menu items may have one of either: a vowel derivative of a consonant character, if the first character menu item of the first set of the plurality of character menu items has a consonant character, a successive vowel of a vowel if the first character menu item of the first set of the plurality of character menu items has a vowel, a successive base radical of a base radical, if the first character menu item of the first set of the plurality of character menu items has a base radical, an upper case letter of a lower case letter, if the first character menu item of the first set of the plurality of character menu items has a lower case letter, a vowel or consonant, if the first character menu item of the first set of the plurality of character menu items has an alphabet name, and—a symbol tied to a block number, if the first character menu item of the first set of the plurality of character menu items has a block number.

Each of the character menu items of the third set of the plurality of character menu items may have any one of a double-consonant conjunct, a derivative symbol of the radical, a successive vowel of the vowel, and a vowel derivative of the consonant, of the character of the second character menu item. Each of the character menu items of the fourth set of the plurality of character menu items may have any one of a triple-consonant conjunct of the third character menu item, and a derivative symbol of the radical of the second character menu item.

BRIEF DESCRIPTION OF THE DRAWINGS

FIG. 2G shows an image, menu, or interface, which can be displayed on a computer monitor in accordance with an embodiment of the present invention, wherein the image of FIG. 2G concerns processing of the Telugu language;

FIG. 3A shows a seventh image, menu, or interface, which can be displayed on a computer monitor in accordance with an embodiment of the present invention, wherein the seventh image concerns processing of the Chinese language;

FIG. 3B shows an eighth image, menu, or interface, which can be displayed on a computer monitor in accordance with an embodiment of the present invention, wherein the eighth image concerns processing of the Chinese language;

FIG. 3C shows a ninth image, menu, or interface, which can be displayed on a computer monitor in accordance with an embodiment of the present invention, wherein the ninth image concerns processing of the Chinese language;

FIG. 3D shows a tenth image, menu, or interface, which can be displayed on a computer monitor in accordance with an embodiment of the present invention, wherein the tenth image concerns processing of the Chinese language;

FIG. 3E shows a eleventh image, menu, or interface, which can be displayed on a computer monitor in accordance with an embodiment of the present invention, wherein the eleventh image concerns processing of the Chinese language;

FIG. 3F shows a twelfth image, menu, or interface, which can be displayed on a computer monitor in accordance with an embodiment of the present invention, wherein the twelfth image concerns processing of the Chinese language;

FIG. 4A shows a thirteenth image, menu, or interface, which can be displayed on a computer monitor in accordance with an embodiment of the present invention, wherein the thirteenth image concerns processing of a Japanese language;

FIG. 4B shows a fourteenth image, menu, or interface, which can be displayed on a computer monitor in accordance with an embodiment of the present invention, wherein the fourteenth image concerns processing of a Japanese language;

FIG. 4C shows a fifteenth image, menu, or interface, which can be displayed on a computer monitor in accordance with an embodiment of the present invention, wherein the fifteenth image concerns processing of a Japanese language;

FIG. 4D shows a sixteenth image, menu, or interface, which can be displayed on a computer monitor in accordance with an embodiment of the present invention, wherein the sixteenth image concerns processing of a Japanese language;

FIG. 5 shows a nineteenth image, menu, or interface, which can be displayed on a computer monitor in accordance with an embodiment of the present invention, wherein the nineteenth image concerns processing of the Korean language;

FIG. 6 shows a twentieth image, menu, or interface, which can be displayed on a computer monitor in accordance with an embodiment of the present invention, wherein the twentieth image concerns processing of the Arabic language;

FIG. 7 shows a twenty-first image, menu, or interface, which can be displayed on a computer monitor in accordance with an embodiment of the present invention, wherein the twenty-first image concerns processing of the Hebrew language;

DETAILED DESCRIPTION OF THE DRAWINGS

Figure 1:
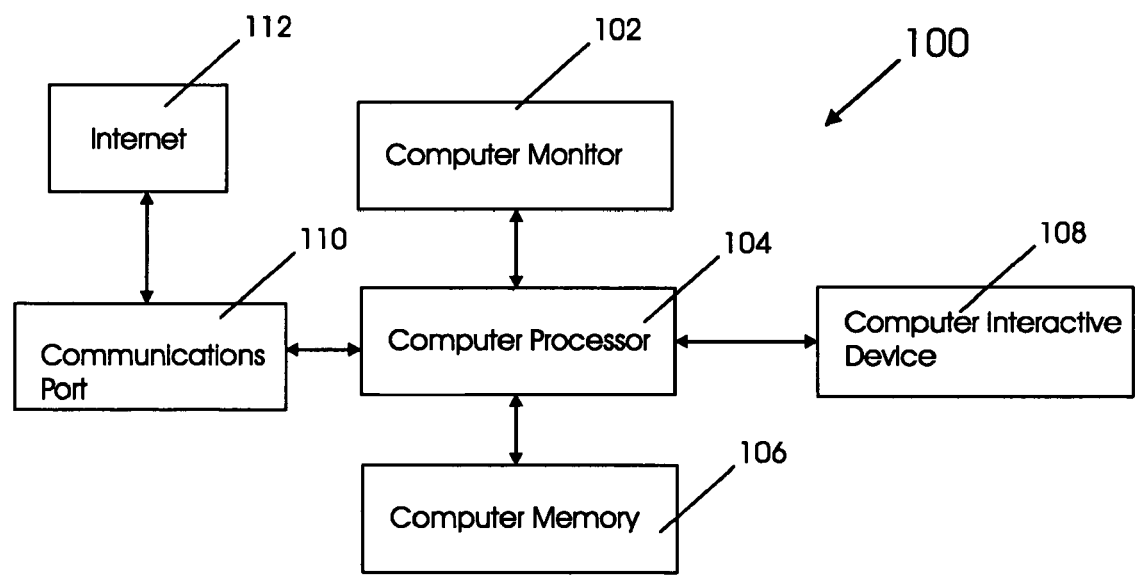
FIG. 1 shows an apparatus for use in accordance with an embodiment of the present invention.

FIG. 1 shows an apparatus 100 for use in accordance with an embodiment of the present invention. The apparatus 100 may include a computer. The apparatus 100 may include a computer monitor 102, a computer processor 104, a computer memory 106, a computer interactive device 108, a communications port 110, and the internet 112. The computer monitor 102, computer memory 106, computer interactive device 108, and communications port 110 may communicate with the computer processor 104 via any type of communications links. The communications port 110 may communicate with the internet 112 via a communications link.

Figure 2A:
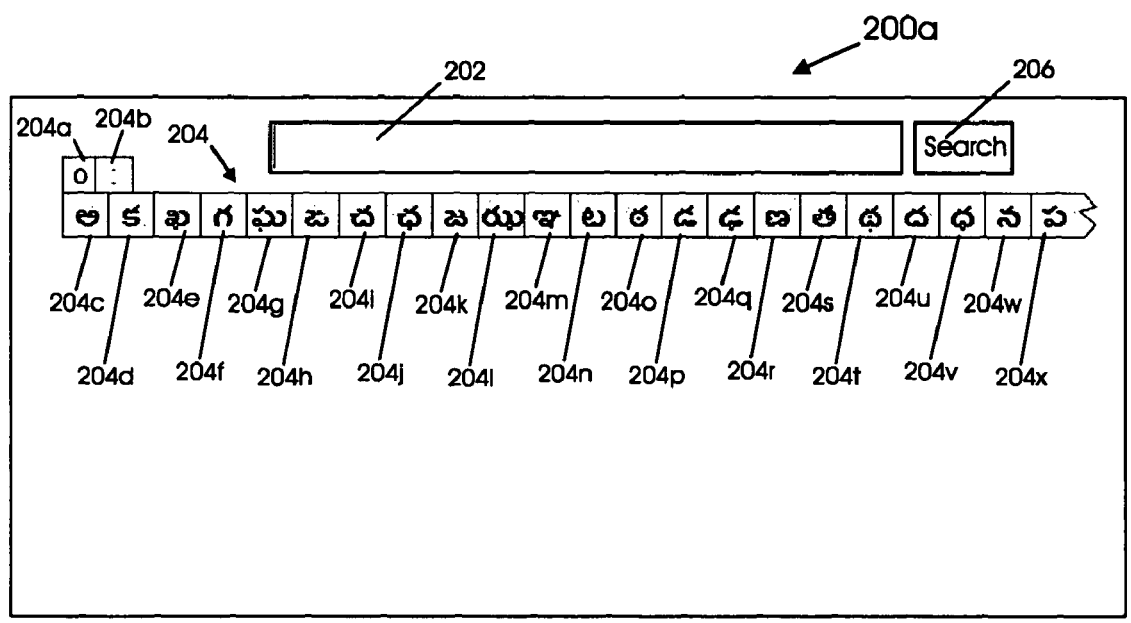
FIG. 2A shows a first image, menu, or interface, which can be displayed on a computer monitor in accordance with an embodiment of the present invention, wherein the first image concerns processing of the Telugu language (a language spoken in India and one of the official and classical languages of India)

FIG. 2A shows a first image, menu, or interface 200a, which can be displayed on the computer monitor 102 in accordance with an embodiment of the present invention. The computer processor 104 may be programmed by a computer program to cause the first image 200a to be displayed on the computer monitor 102. The computer program may be stored in the computer memory 106 and may be executed by the computer processor 104. A person or user can interact with the first image 200a through the computer interactive device 108, which may include a computer mouse, computer keyboard, and the computer monitor 102 itself (for example, in the case where the computer monitor 102 is a touch screen and receives inputs from a user).

The first image 200a concerns processing of the Telugu language, which is a language spoken in India and one of the official and classical languages of India. The first image 200a includes a search box or field 202 for inputting, entering or printing (causing to be displayed in field 202 on the computer monitor 102) Telugu characters. The first image 200a also includes a search button or field 206 which can be clicked on with a computer cursor using a computer mouse or any interactive device to cause searching on the Internet 112 for a character or combination of characters that is displayed in the search box 202 or an intranet not shown. Alternatively, the search box 202 and the search button 206 can be replaced with a web form such as for sending mail, chatting, blogging, or for online advertisement creation.

The first image 200a also includes a set 204 of character menu items, which can be html table cells, buttons or any GUI (Graphical User Interface) components. The set 204 includes character menu items 204a, 204b, 204c, 204d, 204e, 204f, 204g, 204h, 204i, 204j, 204k, 204l, 204m, 204n, 204o, 204p, 204q, 204r, 204s, 204t, 204u, 204v, 204w, and 204x. A user can click on and cause a character from one of these character menu items to be displayed in search box 202. There can be more character menu items following 204x to include the complete set of consonants of the Telugu language. The character menu items 204a-b, show diacritics of the Telugu characters Anuswara (nasal diacritic) "0" and Visarga (breathless 'h' sound following consonant) ":", respectively. The character menu items 204c shows the first vowel, and the character menu items 204d-204x show a plurality of consonants in the Telugu language. There are thirty-five consonants, fourteen vowels, and one "Anuswara" which adds an "an" sound and one Visarga which adds "ah" sound to consonants in the Telugu language.

Figure 2B:
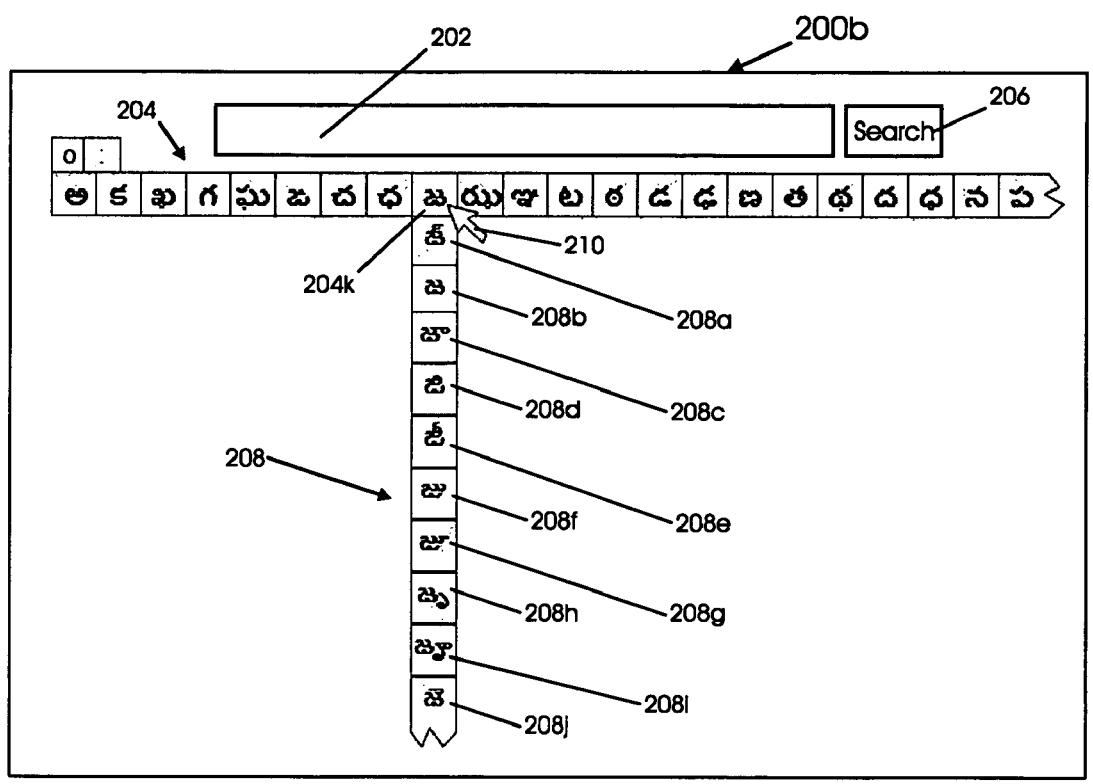
FIG. 2B shows a second image, menu, or interface, which can be displayed on a computer monitor in accordance with an embodiment of the present invention, wherein the second image concerns processing of the Telugu language.

FIG. 2B shows a second image, menu, or interface 200b, which can be displayed on the computer monitor 102 in accordance with an embodiment of the present invention. The computer processor 104 may be programmed by a computer program to cause the second image 200b to be displayed on the computer monitor 102. A person or user can interact with the second image 200b through the computer interactive device 108.

The second image 200b concerns processing of the Telugu language. The second image 200b includes fields 202 and 206, which were previously explained with reference to FIG. 2A. The second image 200b also includes the set 204 of character menu items, previously explained with reference to FIG. 2A. The second image 200b includes a column set 208 of character menu items 208a, 208b, 208c, 208d, 208e, 208f, 208g, 208h, 208i, and 208j. There can be more menu items below 208j in the column set 208. When the first image 200a of FIG. 2A is on a screen of the computer monitor 102, a user can place cursor 210, using the interactive device 108, on or over a character menu item such as 204k to cause a column set such as column set 208 of the second image 200b to be displayed on the computer monitor 102. Each of the characters of the column set 208 is a vowel derivative (diacritic) of the consonant character 204k. A user can click on and print ("print" in this instance meaning cause to be displayed in search box 202 on a computer monitor, such as computer monitor 102) one of these characters in search box 202.

The character menu item 204k includes or shows a consonant of the Telugu language. Placing the cursor on or over the character menu item 204k displays what are called "vowel derivatives" (diacritics) of the consonant of the menu item 204k. The column set 208 shows a plurality of vowel derivatives of the consonant of menu item 204k.

A user can select any of the other character menu items of 204d-204x shown in FIG. 2A, to cause a column of character menu items to appear adjacent, and in line with the character menu item selected. FIG. 2B shows what occurs when character menu item 204k is selected, which causes column 208 to the displayed on the computer monitor 102 adjacent and in a straight line with character menu item 204k. If instead, for example, character menu item 204l was selected, a column 209, shown in FIG. 2G would be displayed adjacent and in a straight line with character menu item 204l. Column 209 would have character menu items related to character menu item 204l, such as vowel derivatives of a consonant character of character menu item 204l. Selecting any other character menu item of 204d-x, would cause a column of character menu items to be displayed on the computer monitor 102, which is related to the character menu item selected, and which is in line with the character menu item selected.

Figure 2C:
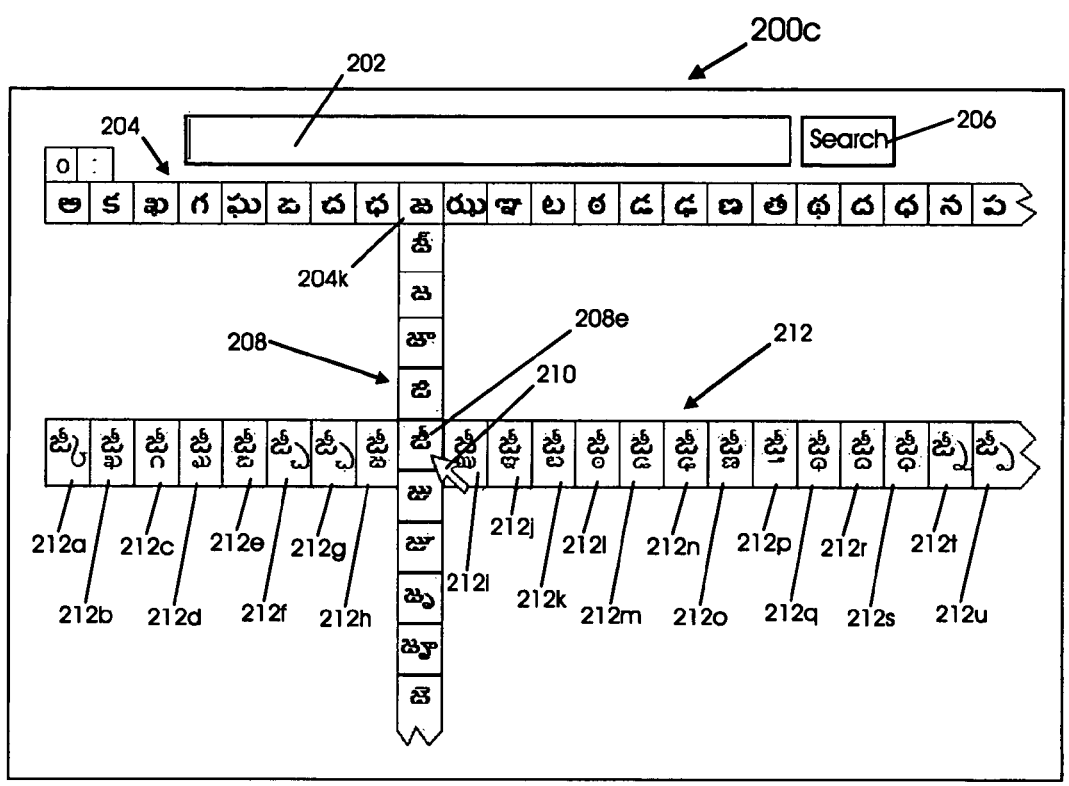
FIG. 2C shows a third image, menu, or interface, which can be displayed on a computer monitor in accordance with an embodiment of the present invention, wherein the third image concerns processing of the Telugu language.

FIG. 2C shows a third image, menu, or interface 200c, which can be displayed on the computer monitor 102 in accordance with an embodiment of the present invention. The computer processor 104 may be programmed by a computer program to cause the third image 200c to be displayed on the computer monitor 102. A person or user can interact with the third image 200c through the computer interactive device 108.

The third image 200c concerns processing of the Telugu language. The third image 200c includes fields 202 and 206, which were previously explained with reference to FIG. 2A. The third image 200c also includes the set 204 of character menu items, previously explained with reference to FIG. 2A. The third image 200c includes a column set 208 of character menu items previously described with reference to FIG. 2B. The third image also includes a row set 212 of character menu items 212a, 212b, 212c, 212d, 212e, 212f, 212g, 212h, 212i, 212j, 212k, 212l, 212m, 212n, 212o, 212p, 212q, 212r, 212s, 212t, and 212u. There can be more character menu items following 212u to corresponding to the remaining consonants of the Telugu language. When the second image 200b of FIG. 2B is on a screen of the computer monitor 102, a user can place cursor 210 (in one embodiment clicking of a computer mouse is not necessary, i.e. the cursor 210 can be just placed over the particular character menu item) through the interactive device 108 on the character menu item 208e to cause the row set 212 of the third image 200c to be displayed on the computer monitor 102. A user can click on and thereby cause one of these characters to be displayed in search box 202. Each of the characters of row set 212 is a double-consonant conjunct derivative of the single consonant vowel derivative 208e. For example, character 212a of image 200c is the double-consonant conjunct character of 208e wherein the first and second consonants involved are 204k and 204d of FIG. 2A respectively.

The character menu item 208e shows a vowel derivative of the Telugu consonant 204k Placing cursor 210 on or over the character menu item 208e displays the set 212 which is a set of first order conjuncts of the vowel derivative character 208e.

Figure 2D:
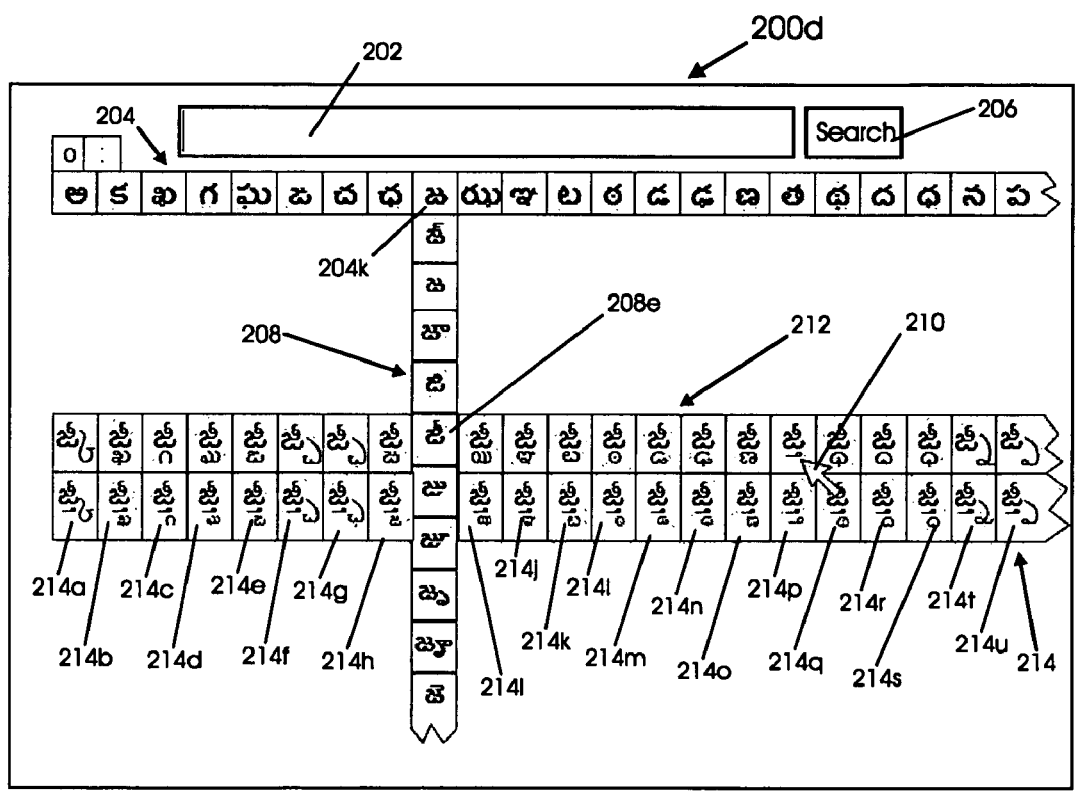
FIG. 2D shows a fourth image, menu, or interface, which can be displayed on a computer monitor in accordance with an embodiment of the present invention, wherein the fourth image concerns processing of the Telugu language.

FIG. 2D shows a fourth image, menu, or interface 200d, which can be displayed on the computer monitor 102 in accordance with an embodiment of the present invention. The computer processor 104 may be programmed by a computer program to cause the fourth image 200d to be displayed on the computer monitor 102. A person or user can interact with the fourth image 200d through the computer interactive device 108.

The fourth image 200d concerns processing of the Telugu language. The fourth image 200d includes fields 202 and 206, which were previously explained with reference to FIG. 2A. The fourth image 200d also includes the sets 204, 208, and 212 of character menu items, previously explained with reference to FIGS. 2A, 2B, and 2C, respectively. The fourth image 200d also includes a row set 214 of character menu items. The row set 214 includes triple-consonant conjunct characters 214a, 214b, 214c, 214d, 214e, 214f, 214g, 214h, 214i, 214j, 214k, 214l, 214m, 214n, 214o, 214p, 214q, 214r, 214s, 214t, and 214u. There can be more character menu items following 214u to include the complete set of triple-consonant conjuncts of the double-consonant conjunct character 212p. A user can click on and print one of these characters in search box or field 202. When the third image 200c of FIG. 2C is on a screen of the computer monitor 102, a user can place cursor 210, using the interactive device 108 on or over the character menu item 212p to cause the row set 214 of the fourth image 200d to be displayed on the computer monitor 102. Each of the characters of row set 214 is a triple-consonant conjunct character. For example, character 214a is a triple-consonant conjunct character wherein the first, second and third consonants involved are 204k, 204s and 204d of image 200a respectively.

The character menu item 212p of image 200c in FIG. 2C shows a first order (double-consonant) conjunct character. Placing cursor 210 using the interactive device 108, on the character menu item 212p causes the set 214 to be displayed which includes the second order (triple-consonant) conjuncts of the first order conjunct character 212p.

Figure 2E:
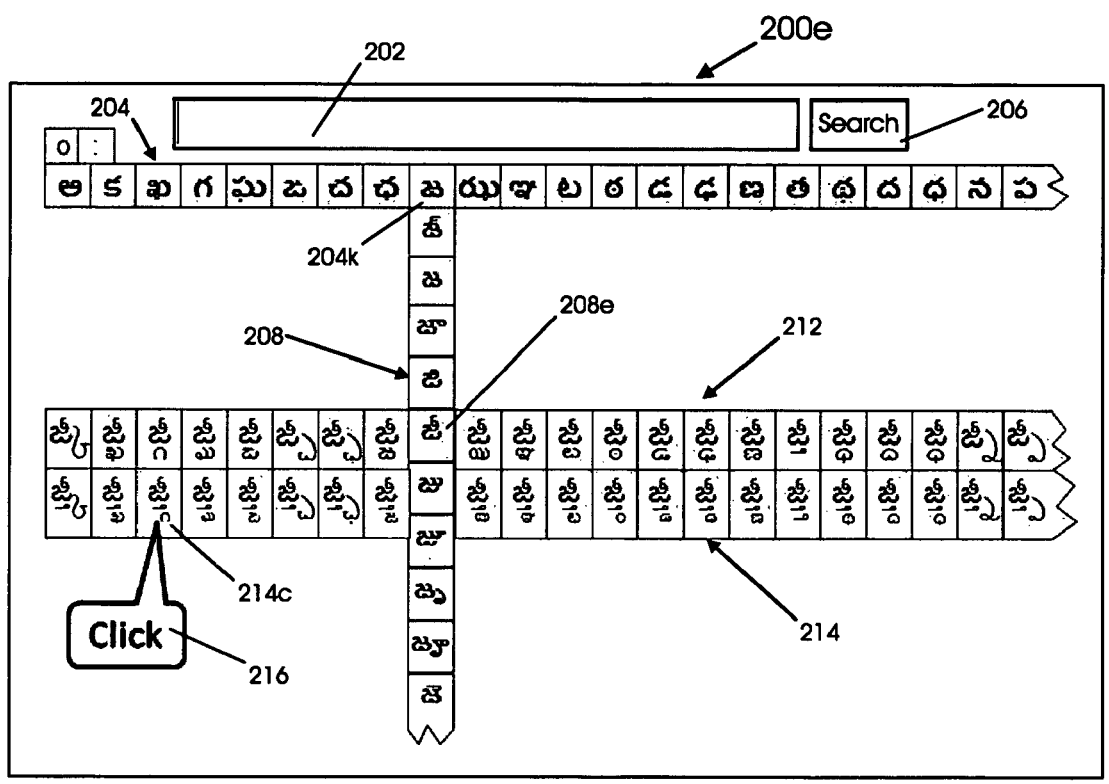
FIG. 2E shows a fifth image, menu, or interface, which can be displayed on a computer monitor in accordance with an embodiment of the present invention, wherein the fifth image concerns processing of the Telugu language.

FIG. 2E shows a fifth image, menu, or interface 200e, which is same as the image 200d of FIG. 2D except for the click graphic 216. The click graphic is shown in FIG. 2E only for explanation purposes to indicate that a user can click on any character menu item such as 214c in order to print it in the search box 202. The click graphic 216 would not typically be displayed visually on a screen of the computer monitor 102.

When the fourth image 200d of FIG. 2D is on a screen of the computer monitor 102, a user can click on a character menu item, such as 214c to print its character in search box 202.

Figure 2F:
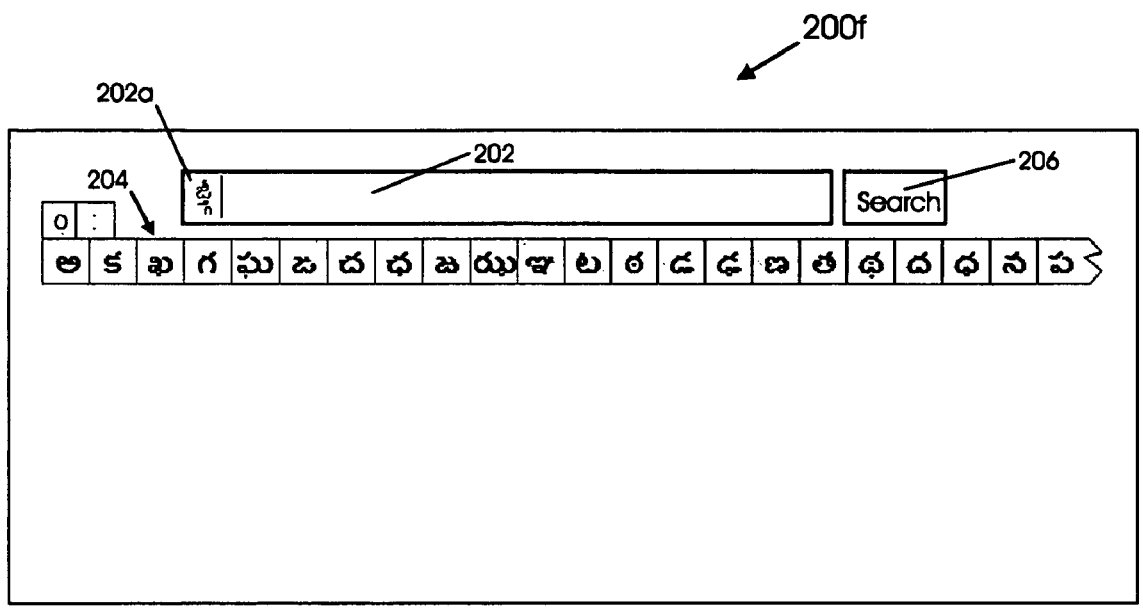
FIG. 2F shows a sixth image, menu, or interface, which can be displayed on a computer monitor in accordance with an embodiment of the present invention, wherein the sixth image concerns processing of the Telugu language.

FIG. 2F shows a sixth image, menu, or interface 200f, which can be displayed on the computer monitor 102 in accordance with an embodiment of the present invention. The computer processor 104 may be programmed by the computer program to cause the sixth image 200f to be displayed on the computer monitor 102. A person or user can interact with the sixth image 200f through the computer interactive device 108.

The sixth image 200f concerns processing of the Telugu language. The sixth image 200f includes fields 202 and 206, which were previously explained with reference to FIG. 2A. The sixth image 200f also includes the set 204 of character menu items, previously explained with reference to FIG. 2A. The sixth image 200f is same as the first image 200a of FIG. 2A except for the character from the character menu item 214c of image 200e which has been inserted into a field 202a of the search box 202. This can be done by clicking, using a computer mouse, the character menu item 214c in image 200e.

One or more embodiments of the present invention provide dynamic language text generation, which is particularly applicable to various non-English languages, such as Chinese, Japanese, and various Indian languages. In at least one embodiment, text can be generated in any language without a keyboard, such as through a computer mouse, stylus, or finger actions on touch screens of computers and wireless devices.

In FIG. 2A, the set 204 includes all the base consonants of the Telugu language. In one embodiment, the set 204 may only include the base consonants or radicals of the particular language, such as Telugu, in this example. This reduces menu file size for the computer memory 106 and processing power required for the computer processor 104.

If the particular language has independent vowels also, only the first vowel is displayed as part of the main menu 204. For example, in FIG. 2A character 204c is the first vowel.

In at least one embodiment of the present invention, required characters are dynamically generated and displayed according to user requirements. For example, when a user points to a consonant, such as one of 204d-204x, shown in FIG. 2A, such as by using a computer mouse, a stylus or a touch screen, all the vowel derivatives (such as partially shown in set 208 of FIG. 2B) of the consonant (such as in menu item 204k) are displayed as a first level sub menu, such as shown in FIG. 2B. The user can select and print any of these vowel derivatives or the base consonant itself using the computer interactive device 108.

Similarly, the full list of independent vowels can be viewed as a sub menu by placing cursor on the first vowel (such as 204c) displayed on the main menu 204, such as shown in image 200a in FIG. 2A. The user can select and print the required vowels from the sub menu. In languages wherein two or more consonants may join to form conjunct consonants, a second level sub menu, such as row set 212 of image 200c in FIG. 2C can be generated showing all possible two-consonant conjuncts by placing a computer cursor on a character menu item of the first level submenu, such as the character menu item 208e of the image 200b in FIG. 2B. Similarly, a third level sub menu, such as the row set 214 of the image 200d in FIG. 2D of three-consonant conjuncts can be displayed when a computer cursor is placed on a second level sub menu character menu item, such as menu item 212p. This implementation of the method, in at least one embodiment of the present invention is very well suited to all Indian and similar languages in which up to three consonants can combine to form conjunct consonants. More specifically, the list of suitable languages include Hindi, Bengali, Assamese, Gujarati, Punjabi, Marathi, Oriya, Kannada, Malayalam and Tamil, and also Sinhalese, the spoken language of Sri Lanka. Tamil is the simplest among all Indian languages requiring only a first level submenu as the language has no concept of conjunct consonants.

FIGS. 3A-3F are related to the Chinese language. FIG. 3A shows an image, menu, or interface 300a for the Chinese language, which can be displayed on the computer monitor 102 in accordance with an embodiment of the present invention. The computer processor 104 may be programmed by a computer program to cause the first image 300a to be displayed on the computer monitor 102. The computer program may be stored in the computer memory 106 and may be executed by the computer processor 104. A person or user can interact with the image 300a through the computer interactive device 108, which may include a computer mouse, computer keyboard, and the computer monitor 102 itself (for example, in the case where the computer monitor 102 is a touch screen and receives inputs from a user).

The image 300a concerns processing of the Chinese language and includes a search box 302 for inputting, entering, or printing Chinese characters. The image 300a also includes a search button 306 which can be clicked on with a computer cursor using a computer mouse or any interactive device of interactive device 108 to cause the computer processor 104 to cause searching on the Internet 112 through communications port 110 or intranet not shown. Alternatively, the search box 302 and the search button 306 can be replaced with a web form for purposes such as sending mail, chatting, blogging, online advertisement creation, and for other purposes.

The image 300a also includes a set 304 of character menu items, which can be html table cells, buttons or any GUI (Graphical User Interface) components. The set 304 includes character menu items 304a, 304b, 304c, 304d, 304e, 304f, 304g, 304h, 304i, 304j, 304k, 304l, 304m, 304n, 304o, 304p, and 304q. There can be more character menu items following 304q to include more Chinese Kangxi radicals. The character menu items 304a-304q show Chinese Kangxi radicals at particular sequential interval positions such as 1, 11, 21, . . . and so on of the Chinese Kangxi radicals set. There are total two hundred and fourteen Kangxi radicals in the Chinese language. Since all these two hundred and fourteen radicals cannot visibly fit in a scroll-free screen, the character set 304 selectively includes only the radicals located at sequential positions 1, 11, 21, . . . and so on of the Kangxi radicals set.

FIG. 3B shows an image, menu, or interface 300b for the Chinese language, which can be displayed on the computer monitor 102 in accordance with an embodiment of the present invention. The computer processor 104 may be programmed by the computer program to cause the image 300b to be displayed on the computer monitor 102. A person or user can interact with the image 300b using the computer interactive device 108.

The image 300b concerns processing of the Chinese language. The image 300b includes the search box or field 302 and search button or field 306, which were previously explained with reference to FIG. 3A.

The image 300b also includes the set 304 of character menu items, previously explained with reference to FIG. 3A. The image 300b includes a column set 308 of character menu items 308a, 308b, 308c, 308d, 308e, 308f, 308g, 308h, 308i, and 308j. When the image 300a of FIG. 3A is on a screen of the computer monitor 102, a user can place computer cursor 310, through the interactive device 108, on the character menu item, 304h to cause the column set 308 of the image 300b to be displayed on the computer monitor 102. The column set 308 shows the Kangxi radical 304h and its nine consecutive Kangxi radicals. Similarly, when a user places cursor over any Kangxi radical of the set 304, a vertical menu or column set of characters is displayed, which includes the Kangxi radical itself and its 9 consecutive Kangxi radicals. However, an exception applies to the last radical of the set 304, wherein the radical itself and its 3 consecutive radicals will be displayed when the cursor 310 is placed over it. The number of radicals in the horizontal menu or row set 304 and vertical menu or corresponding column set for each character item of the row set 304 can be varied according to the designer's choice.

FIG. 3C shows an image, menu, or interface 300c for the Chinese language, which can be displayed on the computer monitor 102 in accordance with an embodiment of the present invention. The computer processor 104 may be programmed by a computer program to cause the image 300c to be displayed on the computer monitor 102. A person or user can interact with the image 300c through the computer interactive device 108.

The image 300c concerns processing of the Chinese language. The image 300c includes fields 302 and 306, which were previously explained with reference to FIG. 3A. The image 300c also includes the row set 304 of character menu items, previously explained with reference to FIG. 3A. The image 300c includes the column set 308 of characters menu items previously described with reference to FIG. 3B. The image 300c also includes an index 312 of character blocks and a block 314a of characters. The block 314a comprises some first few derivative characters of the Kangxi base radical 308e. There can be more or less rows and columns in the block 314a than shown in the image 300c. When the image 300b of FIG. 3B is on a screen of the computer monitor 102, a user can place cursor 310, using the interactive device 108, on the character menu item (Kangxi radical) 308e to cause the index 312 of character blocks and the characters block 314a of the image 300c to be displayed on the computer monitor 102. Each of the characters of the block 314a is a derivative character of the Kangxi base radical 308e. The Kangxi base radical 308e has several derivative characters, which are conveniently divided in this system into seven blocks in order to avoid horizontal and vertical scrolling of their display screen. When a user places cursor 310 on the Kangxi base radical 308e, only the first block 314a of its derivative characters and index 312 of all the blocks are displayed on the screen. Menu items 312a-312g show the derivative character block numbers 1-7 of the Kangxi radical 308e. A user can navigate through all the character blocks and display the required block by placing cursor over the corresponding block number of index 312.

FIG. 3D shows an image, menu, or interface 300d for the Chinese language, which can be displayed on the computer monitor 102 in accordance with an embodiment of the present invention. The computer processor 104 may be programmed by the computer program to cause the image 300d to be displayed on the computer monitor 102. A person or user can interact with the image 300d through the computer interactive device 108.

The image 300d is same as the image 300c of FIG. 3C except for the derivative characters block 314e in place of 314a and the position of cursor 310. When a user places cursor 310 through the interactive device 108 over the menu item 312e of index 312, the previously displayed block of characters 314a disappears and a corresponding block of characters 314e is displayed on the screen of computer monitor 102.

When the image 300c of FIG. 3C is on a screen of the computer monitor 102, a user can place cursor 310, using the interactive device 108, on the menu item 312e of the index 312 of blocks to cause the fifth block of derivative characters of the Kangxi base radical 308e to be displayed on the computer monitor 102 as shown in the image 300d.

FIG. 3E shows an image, menu, or interface 300e, which is same as the image 300d of FIG. 3D except for the click graphic 316. The click graphic 316 is shown in FIG. 3E for explanation purposes to indicate that a user can click on any character menu item of the block 314e, such as character menu item 324a of the block 314e in order to print it in the search box 302. The click graphic 316 would not be displayed visually on the screen. Character 324a refer to the character at the $2^{nd}$ row and $2^{nd}$ column of block 314e.

When the image 300d of FIG. 3D is on a screen of the computer monitor 102, a user can click on the character menu item 324a to print it in the search box or field 302.

FIG. 3F shows an image, menu, or interface 300f, which can be displayed on the computer monitor 102 in accordance with an embodiment of the present invention. The computer processor 104 may be programmed by the computer program to cause the image 300f to be displayed on the computer monitor 102. A person or user can interact with the image 300f through the computer interactive device 108.

The image 300f concerns processing of the Chinese language. The image 300f includes fields 302 and 306, which were previously explained with reference to FIG. 3A. The image 300f also includes the set 304 of character menu items, previously explained with reference to FIG. 3A. Image 300f of FIG. 3F is same as the image 300a of FIG. 3A except for the character 334a taken from menu item 324a of image 300e shown printed in the search box or field 302

In FIG. 3A, the set 304 includes only a few Kangxi radicals of the Chinese language. In one embodiment, the set 304 may include only a few radicals of the particular language, such as Chinese, in this example. This reduces menu file size for the computer memory 106 and processing power required for the computer processor 104.

In at least one embodiment of the present invention, required characters are dynamically generated and displayed according to user needs. For example, when a user points to a Kangxi radical, such as one of 304a-304q, such as by use of a computer mouse, stylus or touch screen, the radical itself and all its succeeding radicals before the next radical in the set 304 are displayed as a first level sub menu or column set 308, such as shown in FIG. 3B. The user can select and print any of the radicals from the first level submenu or column set 308 using the computer interactive device 108.

In a language like Chinese wherein a radical may have several derivative characters, a second level submenu or row set, such as row set 312 of image 300c in FIG. 3C can be displayed showing all block numbers of derivative characters by placing the cursor 310 on a base radical of the first level submenu such as column set 308 of image 300b. Similarly, a third level submenu, such as 314e of image 300d in FIG. 3D, of derivative characters can be displayed when cursor 310 is placed on a second level submenu item such as 312e.

Figure 4E:
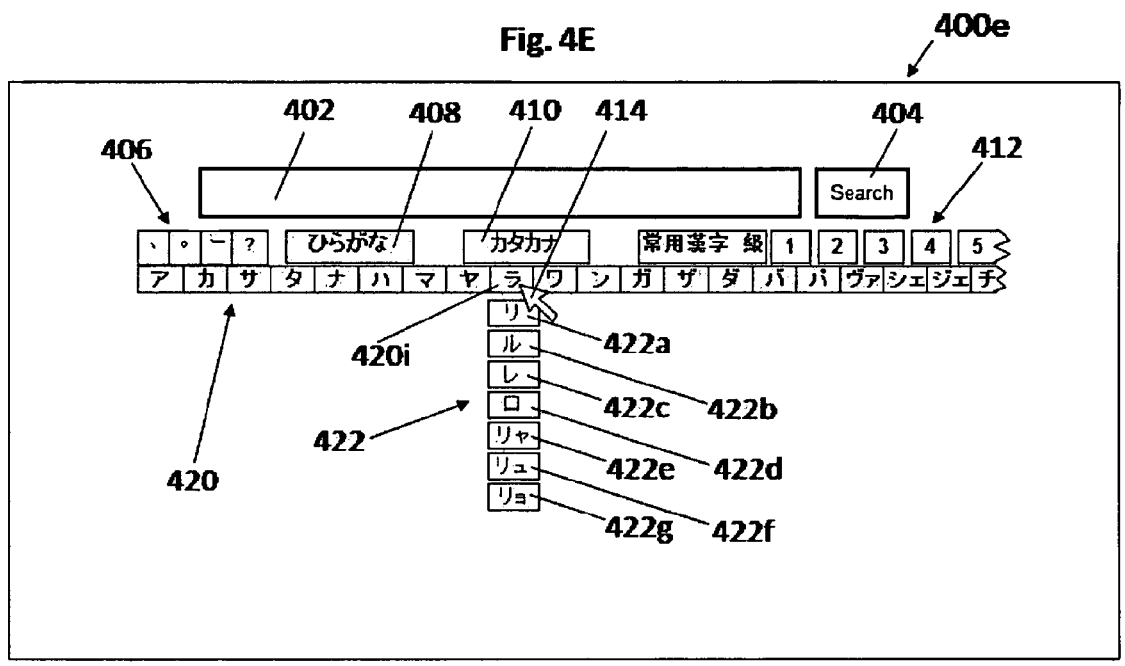
FIG. 4E shows a seventeenth image, menu, or interface, which can be displayed on a computer monitor in accordance with an embodiment of the present invention, wherein the seventeenth image concerns processing of a Japanese language.

FIG. 4A-FIG. 4F are related to the Japanese language. FIG. 4A shows an image, menu, or interface 400a, which can be displayed on the computer monitor 102 in accordance with an embodiment of the present invention. The computer processor 104 may be programmed by a computer program to cause the image 400a to be displayed on the computer monitor 102. The computer program may be stored in the computer memory 106 and may be executed by the computer processor 104. A person or user can interact with the image 400a through the computer interactive device 108, which may include a computer mouse, computer keyboard, and the computer monitor 102 itself (for example, in the case where the computer monitor 102 is a touch screen and receives inputs from a user).

The image 400a concerns processing of the Japanese language. The image 400a includes a search box or field 402 for inputting or entering or printing Japanese characters. The image 400a also includes a search button or field 404 which can be clicked on with a computer cursor using a computer mouse or any interactive device to cause the computer processor 104 to cause searching on the Internet 112 of FIG. 1 or intranet not shown. Alternatively, the search box 402 and the search button 404 can be replaced with a web form for sending mail, chatting, blogging, online advertisement creation etc.

The image 400a also includes menu item set 406, and menu items 408 and 410 and menu item set 412. Menu item sets 406 and 412 include a plurality of menu items. Each of the menu items can be an html table cell, a button or any GUI (Graphical User Interface) component. Menu item set 406 may be a set of Japanese punctuation characters 406a, 406b, 406c and 406d or menu items. A user can click on and print any of the characters shown in menu items 406a-d in search box 402, by using the interactive device 108. Menu items 408, 410 and menu item set 412 provide links to the Japanese character sets Hiragana, Katakana and Kanji respectively.

FIG. 4B shows an image, menu, or interface 400b, which can be displayed on the computer monitor 102 in accordance with an embodiment of the present invention. The computer processor 104 may be programmed by a computer program to cause the image 400b to be displayed on the computer monitor 102. A person or user can interact with the image 400b through the computer interactive device 108.

The image 400b concerns processing of the Japanese language. The image 400b includes fields 402 and 404, which were previously explained with reference to FIG. 4A. The image 400b also includes menu item set 406, menu items 408 and 410 and menu item set 412, previously explained with reference to FIG. 4A. The image 400b also includes a cursor 414. The image 400b further includes a row set 416 of character menu items 416a, 416b, 416c, 416d, 416e, 416f, 416g, 416h, 416i, 416j, 416k, 416l, 416m, 416n, 416o, and 408p. When the image 400a of FIG. 4A is on a screen of the computer monitor 102, a user can place the cursor 414, by using the interactive device 108, on the menu item 408 to cause the row set 416 of the image 400b to be displayed on the computer monitor 102. A user can click on and cause any of the characters of the row set 416 to be displayed in the search box 402. The first character 416a of the row set 416 is the first vowel of the Japanese Hiragana alphabet. Characters 416b-416p are consonants of the Hiragana alphabet. For example, character menu item 416g is the Hiragana consonant 'ma'.

FIG. 4C shows an image, menu, or interface 400c, which can be displayed on the computer monitor 102 in accordance with an embodiment of the present invention. The computer processor 104 may be programmed by the computer program to cause the image 400c to be displayed on the computer monitor 102. A person or user can interact with the image 400c by using the computer interactive device 108.

The image 400c concerns processing of the Japanese language. The image 400c includes fields 402 and 404, which were previously explained with reference to FIG. 4A. The image 400c also includes menu item set 406, menu items 408 and 410 and menu item set 412, previously explained with reference to FIG. 4A. The image 400c also includes a cursor 414. The image 400c further includes a row set 416 of character menu items, previously explained with reference to FIG. 4B. Additionally, the image 400c includes a column set 418 of character menu items 418a, 418b, 418c, 418d, 418e, 418f and 418g. Each of the character menu items 418a-418g is a vowel derivative (syllable) of the Hiragana consonant 416g. When the image 400b of FIG. 4B is on a screen of the computer monitor 102, a user can place cursor 414, using the interactive device 108, on the character menu item 416g to cause the column set 418 of the image 400c to be displayed on the computer monitor 102. A user can click on and cause any of the characters of the column set 418 to be displayed in search box 402. When the user clicks on character menu item 418a, for example, the character in menu item 418a appears in the left hand corner of search box 402. Similarly, a user can view the derivatives (syllables) of any Hiragana consonant by placing the cursor 414 on the particular Hiragana consonant (located in a particular menu item of row set 416. Any desired derivative (syllable) can be printed by clicking on it with the computer interactive device 108. A user can also view all vowels of the Hiragana alphabet by placing the cursor 414 on the first vowel (character menu item) 416a of image 400b in FIG. 4B. Any desired vowel can be displayed in search box 402 by clicking on the corresponding menu item in which it is located using the computer interactive device 108.

FIG. 4D shows an image, menu, or interface 400d, which can be displayed on the computer monitor 102 in accordance with an embodiment of the present invention. The computer processor 104 may be programmed by the computer program to cause the image 400d to be displayed on the computer monitor 102. A person or user can interact with the image 400d through the computer interactive device 108.

The image 400d concerns processing of the Japanese language. The image 400d includes fields 402 and 404, which were previously explained with reference to FIG. 4A. The image 400d also includes menu item sets 406 and 412, and menu items 408 and 410, previously explained with reference to FIG. 4A. The image 400d also includes a cursor 414. The image 400d further includes a row set 420 of character menu items 420a, 420b, 420c, 420d, 420e, 420f, 420g, 420h, 420i, 420j, 420k, 420l, 420m, 420n, 420o, 420p, 420q, 420r, 420s and 420t. Character menu item 420a shows or includes the first vowel of the Japanese Katakana alphabet. Each of the characters menu items 420b-420t shows or includes a Katakana consonant. There can be more character menu items beyond 420t to include the remaining Katakana consonants.

When the image 400a of FIG. 4A is on a screen of the computer monitor 102, a user can place cursor 414, using the interactive device 108, on the menu item 410 to cause the row set 420 of the image 400d to be displayed on the computer monitor 102. A user can click on any of the character menu items of the row set 420 to cause the corresponding character to be displayed in the search box 402. Print means making a character appear in the search box or adding it to the search box.

FIG. 4E shows an image, menu, or interface 400e, which can be displayed on the computer monitor 102 in accordance with an embodiment of the present invention. The computer processor 104 may be programmed by the computer program to cause the image 400e to be displayed on the computer monitor 102. A person or user can interact with the image 400e through the computer interactive device 108.

The image 400e concerns processing of the Japanese language. The image 400e includes fields 402 and 404, which were previously explained with reference to FIG. 4A.

The image 400e also includes menu item set 406, menu items 408 and 410 and menu item set 412, previously explained with reference to FIG. 4A. The image 400e also includes the cursor 414. The image 400e further includes a row set 420 of character menu items, previously explained with reference to FIG. 4D. Additionally, the image 400e includes a column set 422 of character menu items 422a, 422b, 422c, 422d, 422e, 422f and 422g. Each of the character menu items 422a-422g includes or shows a vowel derivative (syllable) of the Katakana consonant in menu item 420i shown in image 400d of FIG. 4D. When the image 400d of FIG. 4D is on a screen of the computer monitor 102, a user can place cursor 414, using the interactive device 108, on the character menu item 420i to cause the column set 422 of the image 400e to be displayed on the computer monitor 102. A user can click one of menu items of the column set 422 to cause the corresponding vowel derivative (syllable) to be displayed in the search box 402. Similarly, a user can view the derivatives (syllables) of any Katakana consonant by placing the cursor 414 on a menu item, which has that Katakana consonant of menu items 420b-420t and beyond. A desired derivative (syllable) can be made to appear in the search box 402 by clicking on the corresponding menu item comprising that derivative (syllable) with the computer interactive device 108.

A user can also view all vowels of the Katakana alphabet as a column set by placing the cursor 414 on the first vowel (character menu item) 420a of image 400d in FIG. 4D. A desired vowel can be made to appear in the search box 402 by clicking on the menu item, which has that particular vowel with the computer interactive device 108.

Figure 4F:
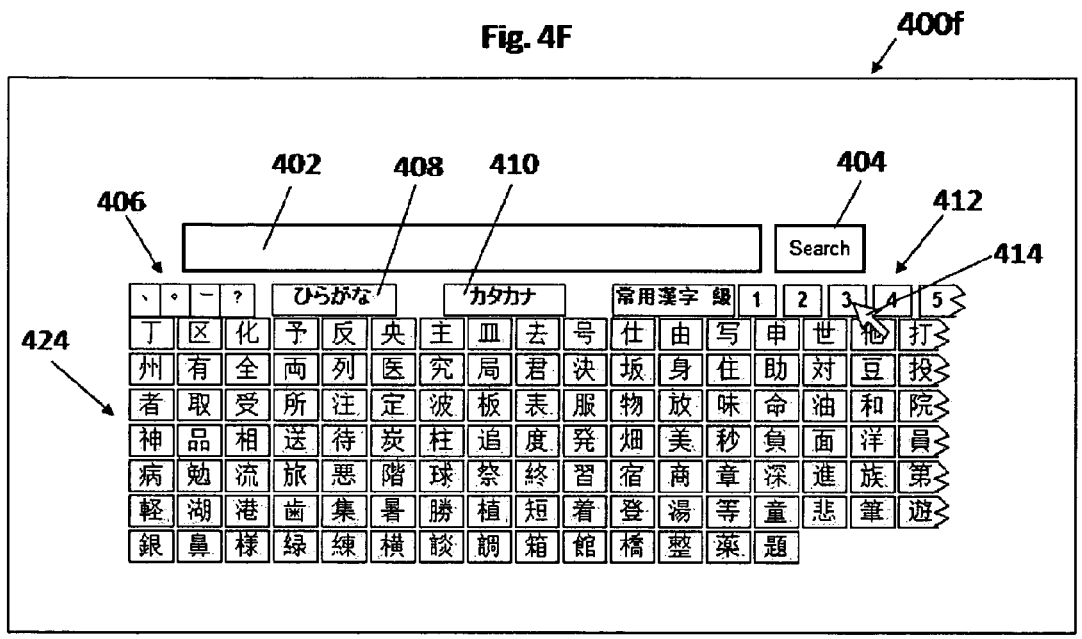
FIG. 4F shows an eighteenth image, menu, or interface, which can be displayed on a computer monitor in accordance with an embodiment of the present invention, wherein the eighteenth image concerns processing of a Japanese language.

FIG. 4F shows an image, menu, or interface 400f, which can be displayed on the computer monitor 102 in accordance with an embodiment of the present invention. The computer processor 104 may be programmed by the computer program to cause the image 400f to be displayed on the computer monitor 102. A person or user can interact with the image 400f through the computer interactive device 108.

The image 400f concerns processing of the Japanese language. The image 400f includes fields 402 and 404, which were previously explained with reference to FIG. 4A. The image 400f also includes menu item set 406, menu items 408 and 410 and menu item set 412, previously explained with reference to FIG. 4A. The image 400f also includes the cursor 414. The image 400f further includes a block 424 of character menu items, which is a set of Japanese Kanji characters. There can be more characters in the block 424 than shown in the image 400f. When the first image 400a of FIG. 4A is on a screen of the computer monitor 102, a user can place the cursor 414, using the interactive device 108, on the menu item 412d (block number 3 of Kanji characters) to cause the Kanji block 424 of the image 400f to be displayed on the computer monitor 102. A user can click any one of the menu items of the block 424, each including a Kanji character to thereby cause that character to be displayed in the search box 402. Similarly, a user can view other Kanji character blocks by placing the cursor 414 on their corresponding number in the menu item set 412. A desired Kanji character can be clicked on, using the interactive device 108 and displayed or made to appear in the search box 402. There can be more block numbers in menu item set 412 covering the entire set of Kanji characters.

One or more embodiments of the present invention provide dynamic language text generation, which is particularly applicable to various non-English languages, such as Chinese, Japanese, and various Indian languages. In at least one embodiment, text can be generated in any language without a keyboard, such as through a computer mouse, stylus, or finger actions on touch screens of computers and wireless devices.

In FIG. 4B, the set 416 includes all base consonants of the Japanese Hiragana alphabet. Similarly, in FIG. 4D, the set 420 includes all base consonants of the Japanese Katakana alphabet. In one embodiment, the sets 416 and 420 may only include the base consonants or radicals of the particular language, such as Japanese, in this example. This reduces menu file size for the computer memory 106 and processing power required for the computer processor 104.

If the particular language has independent vowels also, only the first vowel is displayed as part of the main menu. For example, in FIG. 4B, character 416a is the first vowel of the Hiragana alphabet.

In at least one embodiment of the present invention, required characters are dynamically generated and displayed according to user requirements. For example, when a user points to a consonant, such as one of menu items 416b-416p of set 416, shown in FIG. 4B through a computer mouse, stylus or touch screen, all the vowel derivatives (such as shown in set 418 for the consonant shown in menu item 416g) of the particular consonant (such as consonant in menu item 416g in this example) are displayed as a submenu, such as shown in FIG. 4C. The user can select and cause to be displayed in the search box 402 any of these vowel derivatives or the base consonant itself using the computer interactive device 108. Similarly, the full list of independent vowels can be viewed as a sub menu by placing the cursor 414 on the first vowel (such as 416a, in one example) displayed on the main menu, such as image 400b in FIG. 4B. A user can select and print the required vowels from the sub menu.

If a particular language, such as Japanese has several symbolic characters, they can be organized into a number of blocks, with each block comprising as many symbols as can be conveniently displayed on a scroll-free computer screen.

FIG. 5 shows an image, menu, or interface 500, which can be displayed on the computer monitor 102 in accordance with an embodiment of the present invention. The computer processor 104 may be programmed by a computer program to cause the image 500 to be displayed on the computer monitor 102. The computer program may be stored in the computer memory 106 and may be executed by the computer processor 104. A person or user can interact with the image 500 through the computer interactive device 108, which may include a computer mouse, computer keyboard, and the computer monitor 102 itself (for example, in the case where the computer monitor 102 is a touch screen and receives inputs from a user).

Image 500 concerns processing of the Korean language. Image 500 includes a search box or field 502 for inputting or entering or printing Korean characters. Image 500 also includes a search button 504 which can be clicked on with a computer cursor using a computer mouse or any interactive device, such as 108, to cause the computer processor 104 to cause searching on the Internet 112 or intranet, not shown. Alternatively, the search box 502 and the search button 504 can be replaced with a web form for sending mail, chatting, blogging, online advertisement creation etc.

Image 500 also includes menus 506, 508, 510 and a cursor 512. Menu 506 comprises a row set of menu items, each one of which contains a Korean consonant. There can be more menu items than shown in the image 500 to include the remaining Korean consonants. Each Menu item can be an html table cell, a button or any GUI (Graphical User Interface) component. Menu 508 comprises a column set of menu items, each of which contains or includes a Korean syllable. The Korean syllables include an initial consonant and a medial vowel. There can be more menu items than shown in the image 500 to include the remaining such syllables. Menu 510 comprises a row set of menu items, each one of which contains a Korean syllables with an initial consonant, a medial vowel and a final consonant. There will be more menu items than shown in the image 500 to include the remaining such syllables. Initially, only menu 506 of consonants is displayed along with the search box 502 and the search button 504. A user can click and print one of these characters in search box 502 through the interactive device 108. When a user places cursor 512, using the interactive device 108 on a menu item including a Korean consonant, such as menu item 506g, all of the syllables with a medial vowel (for example 508 in this case) of the particular Korean consonant of the menu item (in this case 506g) are displayed as a vertical set (in this example 508) of characters. A user can click and cause one of these syllables to be displayed in search box 502 using the interactive device 108. When a user places cursor 512 on one of the menu items of these characters, such as 508e, all the character's extended syllables with a final consonant are displayed as a row set such as row set 510 for the character 508e. A user can click and print one of these extended syllables (such as shown in row set 510) in search box 502. Similarly, any syllable of any consonant can be located and printed in search box 502.

FIG. 6 shows an image, menu, or interface 600, which can be displayed on the computer monitor 102 in accordance with an embodiment of the present invention. The computer processor 104 may be programmed by a computer program to cause the image 600 to be displayed on the computer monitor 102. The computer program may be stored in the computer memory 106 and may be executed by the computer processor 104. A person or user can interact with the image 600 through the computer interactive device 108, which may include a computer mouse, computer keyboard, and the computer monitor 102 itself (for example, in the case where the computer monitor 102 is a touch screen and receives inputs from a user).

Image 600 concerns processing of the Arabic language. Image 600 includes a search box 602 for inputting or entering or printing Arabic characters. Image 600 also includes a search button 604 which can be clicked on with a computer cursor using a computer mouse or any interactive device 108 to cause the computer processor 104 to cause searching on the Internet 112 of FIG. 1, or intranet, not shown. Alternatively, the search box 602 and the search button 604 can be replaced with a web form for sending mail, chatting, blogging, online advertisement creation etc.

Image 600 also includes a main menu 606, a submenu 608 and a cursor 610. Menu 606 comprises a plurality of menu items, which include a row set of Arabic punctuation characters and numbers, and another row set of Arabic base letters. There can be more menu items in main menu 606 than shown in the image 600 to include the remaining Arabic base letters. Each of the Menu items can be an html table cell, a button or any GUI (Graphical User Interface) component. Submenu 608 comprises a column set of character menu items which show or include syllables (vowel diacritics) of the Arabic consonant 606b shown in the image 600. The column set can comprise more syllables than shown in the image 600. Initially, only menu 606 is displayed along with the search box 602 and the search button 604. A user can click and print one of these characters in search box 602 by using the interactive device 108. When a user places cursor 610, using the interactive device 108 on a character menu item including an Arabic base letter, such as menu item 606b, all the corresponding character's syllables (vowel diacritics) are displayed as a column set, such as column set 608 for the example of menu item 606b. A user can click and print one of these syllables (vowel diacritics) in search box 602 through the use of the interactive device 108. Similarly, any syllable of any base letter can be located and printed in search box 602.

FIG. 7 shows an image, menu, or interface 700, which can be displayed on the computer monitor 102 in accordance with an embodiment of the present invention. The computer processor 104 may be programmed by a computer program to cause the image 700 to be displayed on the computer monitor 102. The computer program may be stored in the computer memory 106 and may be executed by the computer processor 104. A person or user can interact with the image 700 through the computer interactive device 108, which may include a computer mouse, computer keyboard, and the computer monitor 102 itself (for example, in the case where the computer monitor 102 is a touch screen and receives inputs from a user).

Image 700 concerns processing of the Hebrew language. Image 700 includes a search box 702 for inputting or entering or printing Hebrew characters. Image 700 also includes a search button 704 which can be clicked on with a computer cursor using a computer mouse or any interactive device to cause searching on the Internet or intranet. Alternatively, the search box 702 and the search button 704 can be replaced with a web form for sending mail, chatting, blogging, online advertisement creation etc.

Image 700 also includes a main menu 706, a submenu 708 and a cursor 710. Menu 706 comprises a plurality of menu items which include a row set of Hebrew punctuation characters and another row set of Hebrew consonants. There can be more menu items than shown in the image 700 to include the remaining Hebrew consonants. Each of the menu items can be an html table cell, a button, or any GUI (Graphical User Interface) component. Menu 708 comprises a column set of menu items, each of which includes a syllable (vowel diacritic) of the Hebrew consonant of menu item 706e shown in the image 700. The particular column set (such as in one example 708) can comprise more syllables than shown in the image 700. Initially, only menu 706 is displayed along with the search box 702 and the search button 704. A user can click and print one of these consonants in search box 702 through the interactive device 108. When a user places cursor 710 through the interactive device 108 on a Hebrew consonant such as shown in menu item 706e, all that consonant's syllables (vowel diacritics) are displayed as a column set, such as column set 708, for menu item 706e. A user can click and print one of these syllables (vowel diacritics) in search box 702 through the interactive device 108. Similarly, any syllable of any consonant can be located and printed in search box 702.

Figure 8:
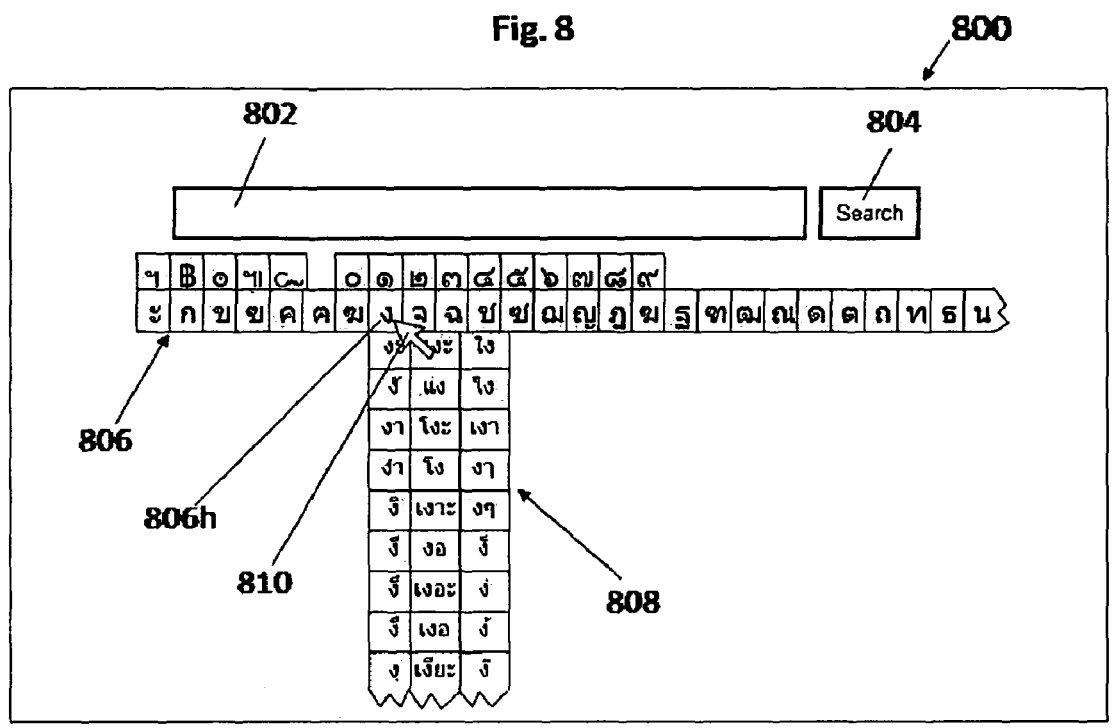
FIG. 8 shows a twenty-second image, menu, or interface, which can be displayed on a computer monitor in accordance with an embodiment of the present invention, wherein the twenty-second image concerns processing of the That language.

FIG. 8 shows an image, menu, or interface 800, which can be displayed on the computer monitor 102 in accordance with an embodiment of the present invention. The computer processor 104 may be programmed by a computer program to cause the image 800 to be displayed on the computer monitor 102. The computer program may be stored in the computer memory 106 and may be executed by the computer processor 104. A person or user can interact with the image 800 through the computer interactive device 108, which may include a computer mouse, computer keyboard, and the computer monitor 102 itself (for example, in the case where the computer monitor 102 is a touch screen and receives inputs from a user).

Image 800 concerns processing of the That language. Image 800 includes a search box 802 for inputting or entering or printing That characters. Image 800 also includes a search button 804 which can be clicked on with a computer cursor using a computer mouse or any interactive device 108 to cause the computer processor 104 to cause searching on the Internet, such as 112 in FIG. 1. or intranet, not shown. Alternatively, the search box 802 and the search button 804 can be replaced with a web form for sending mail, chatting, blogging, online advertisement creation etc.

Image 800 also includes a main menu 806, a submenu 808 and a cursor 810. Menu 806 comprises a first row set of menu items, which include That punctuation characters and numbers, and a second row set of menu items, which include the first That vowel mark and consonants. There can be more menu items than shown in the image 800 to include the remaining That consonants. Each menu item can be an html table cell, a button or any GUI (Graphical User Interface) component. Menu 808 comprises a block of menu items, which include vowel diacritics of the That consonant of menu item 806h shown in the image 800. The block 808 of menu items can comprise more vowel diacritics (syllables) than shown in the image 800. Initially, only menu 806 comprising That punctuation characters, numbers, the first That vowel mark and consonants is displayed along with the search box 802 and the search button 804. A user can click and print one of these characters in search box 802 through the interactive device 108. When a user places cursor 810, using the interactive device 108 on a menu item containing a That consonant, such as 806h, all that consonant's vowel diacritics are displayed as a block, such as block 808 for menu item 806h. A user can click and print one of these vowel diacritics in search box 802 through the interactive device 108. Similarly, any vowel diacritic of any consonant can be located and printed in search box 802. Also, all That vowel marks can be displayed by placing cursor 810 over the menu item containing the first That vowel mark. A user can click and print one of these vowels in search box 802.

Figure 9:
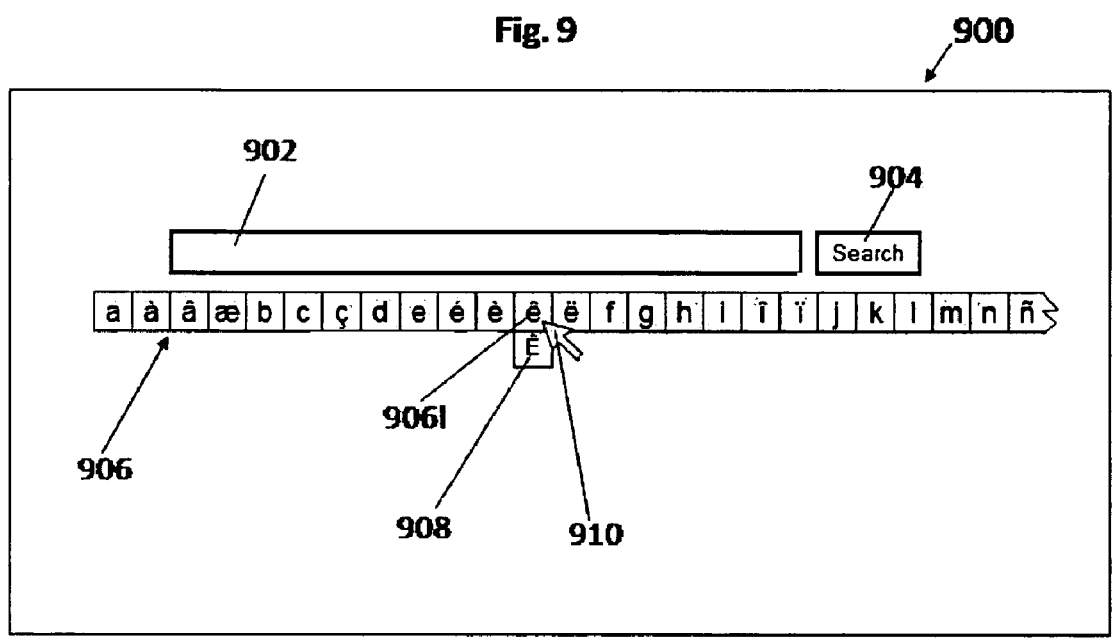
FIG. 9 shows a twenty-third image, menu, or interface, which can be displayed on a computer monitor in accordance with an embodiment of the present invention, wherein the twenty-third image concerns processing of the French language.

FIG. 9 shows an image, menu, or interface 900, which can be displayed on the computer monitor 102 in accordance with an embodiment of the present invention. The computer processor 104 may be programmed by a computer program to cause the image 900 to be displayed on the computer monitor 102. The computer program may be stored in the computer memory 106 and may be executed by the computer processor 104. A person or user can interact with the image 900 through the computer interactive device 108, which may include a computer mouse, computer keyboard, and the computer monitor 102 itself (for example, in the case where the computer monitor 102 is a touch screen and receives inputs from a user).

Image 900 concerns processing of the French language. Image 900 includes a search box 902 for inputting or entering or printing French characters. Image 900 also includes a search button 904 which can be clicked on with a computer cursor using a computer mouse or any interactive device, such as 108, to cause the computer processor 104 to cause searching on the Internet 112 of FIG. 1, or intranet, not shown. Alternatively, the search box 902 and the search button 904 can be replaced with a web form for sending mail, chatting, blogging, online advertisement creation etc.

Image 900 also includes a main menu 906, a submenu 908 and a cursor 910. Menu 906 comprises a row set of menu items, which include lower case French letters, their ligatures and diacritics. There can be more menu items than shown in the image 900 to include the remaining French letters. Each of the plurality of menu items can be an html table cell, a button, or any GUI (Graphical User Interface) component. Menu 908 comprises only the upper case letter of the French letter 906l shown in the image 900. Initially, only menu 906 of lower case French alphabet letters is displayed along with the search box 902 and the search button 904. A user can click and print one of these letters in search box 902 using the interactive device 108. When a user places cursor 910 using the interactive device 108 on a menu item containing a lower case French letter such as menu item 906l, the particular letter's upper case letter is displayed as a single character menu 908. A user can click and print this upper case letter in search box 902 using the interactive device 108.

Figure 10:
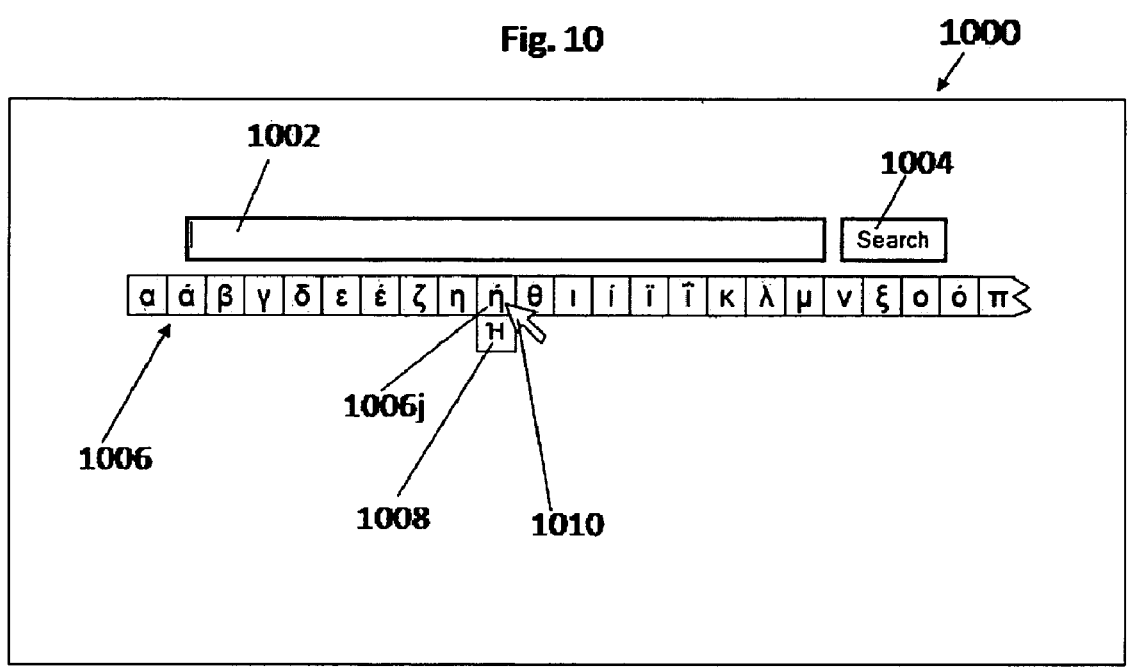
FIG. 10 shows a twenty-fourth image, menu, or interface, which can be displayed on a computer monitor in accordance with an embodiment of the present invention, wherein the twenty-fourth image concerns processing of the Greek language.

FIG. 10 shows an image, menu, or interface 1000, which can be displayed on the computer monitor 102 in accordance with an embodiment of the present invention. The computer processor 104 may be programmed by a computer program to cause image 1000 to be displayed on the computer monitor 102. The computer program may be stored in the computer memory 106 and may be executed by the computer processor 104. A person or user can interact with the image 1000 through the computer interactive device 108, which may include a computer mouse, computer keyboard, and the computer monitor 102 itself (for example, in the case where the computer monitor 102 is a touch screen and receives inputs from a user).

Image 1000 concerns processing of the Greek language. Image 1000 includes a search box 1002 for inputting or entering or printing Greek characters. Image 1000 also includes a search button 1004 which can be clicked on with a computer cursor using a computer mouse or any interactive device to cause searching on the Internet or intranet. Alternatively, the search box 1002 and the search button 1004 can be replaced with a web form for sending mail, chatting, blogging, online advertisement creation etc.

Image 1000 also includes a main menu 1006, a submenu 1008 and a cursor 1010. Menu 1006 comprises a row set of menu items, which include lower case Greek letters and their diacritics. There can be more menu items than shown in the image 1000 to include the remaining lower case letters. Each of the menu items can be a html table cell, a button or any GUI (Graphical User Interface) component. Menu 1008 comprises only the upper case letter of the lower case Greek letter 1006j shown in image 1000. Initially, only menu 1006 of lower case Greek letters is displayed along with the search box 1002 and the search button 1004. A user can click and print one of these letters in search box 1002 using the interactive device 108. When a user places cursor 1010 using the interactive device 108 on a menu item having a lower case Greek letter such as 1006j, the upper case letter of the letter of the particular menu item is displayed as a single character menu 1008. A user can click and print this upper case letter in search box 1002 using the interactive device 108.

Figure 11:
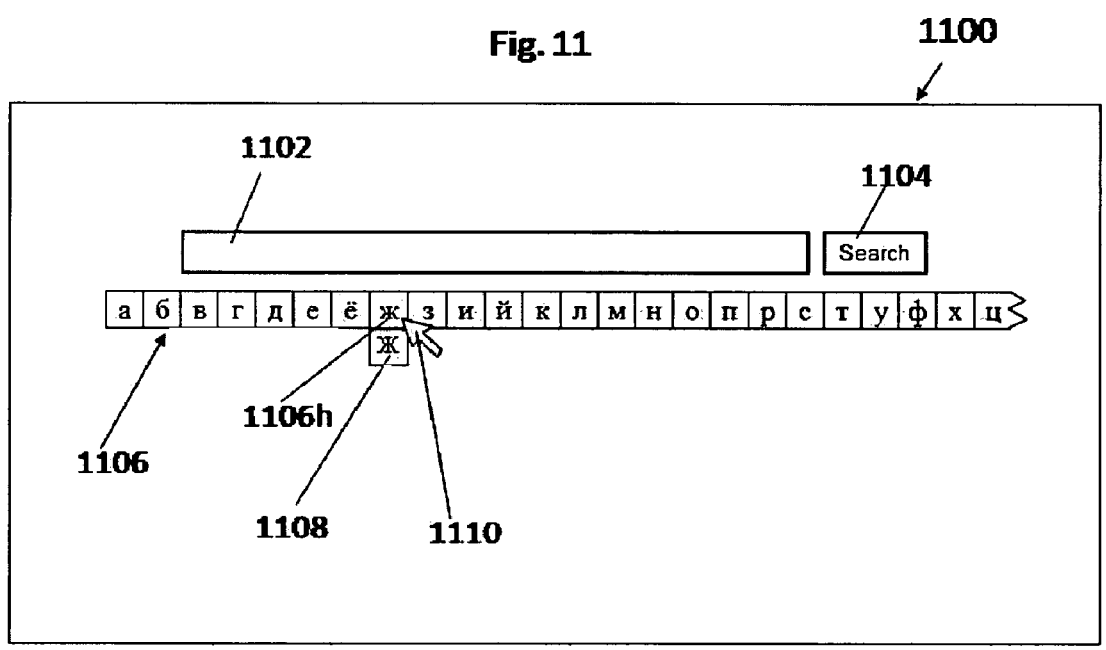
FIG. 11 shows a twenty-fifth image, menu, or interface, which can be displayed on a computer monitor in accordance with an embodiment of the present invention, wherein the twenty-fifth image concerns processing of the Russian language.

FIG. 11 shows an image, menu, or interface 1100, which can be displayed on the computer monitor 102 in accordance with an embodiment of the present invention. The computer processor 104 may be programmed by a computer program to cause image 1100 to be displayed on the computer monitor 102. The computer program may be stored in the computer memory 106 and may be executed by the computer processor 104. A person or user can interact with the image 1100 through the computer interactive device 108, which may include a computer mouse, computer keyboard, and the computer monitor 102 itself (for example, in the case where the computer monitor 102 is a touch screen and receives inputs from a user).

Image 1100 concerns processing of the Russian language. Image 1100 includes a search box 1102 for inputting or entering or printing Russian characters. Image 1100 also includes a search button 1104 which can be clicked on with a computer cursor using a computer mouse or any interactive device to cause searching on the Internet or intranet. Alternatively, the search box 1102 and the search button 1104 can be replaced with a web form for sending mail, chatting, blogging, online advertisement creation etc.

Image 1100 also includes a main menu 1106, a submenu 1108 and a cursor 1110. Menu 1106 comprises a row set of menu items, which include lower case Russian letters and their diacritics. There can be more menu items than shown in the image 1100 to include the remaining lower case letters. Each of the menu items can be an html table cell, a buttons or any GUI (Graphical User Interface) component. Menu 1108 comprises only the upper case letter of the lower case Russian letter 1106*h* shown in image 1100. Initially, only menu 1106 of lower case Russian letters is displayed. A user can click and print one of these letters in search box 1102 using the interactive device 108. When a user places cursor 1110 using the interactive device 108 on a menu item having a lower case Russian letter such as 1106*h*, the upper case letter of the particular letter of the particular menu item, is displayed as a single character menu 1108. A user can click and print this upper case letter in search box 1102 using the interactive device 108.

The concept of dynamic menus in accordance with at least one embodiment of the present invention, can be applied to any language of the world, irrespective of its type, whether alphabetic or symbolic.

There could be several ways of coding dynamic character menus. One way of developing dynamic menus is through Dynamic Hypertext Markup Language and a web scripting language such as JavaScript. Another possibility is through Java Applets. The required non-English characters can be graphically displayed through Unicode numbers or custom fonts. Non-English characters that are constituted by two or more Unicode numbers can be programmatically constructed at the processor run time by passing all the constituent Unicode numbers as arguments of a programming method.

This invention finds significant utility in the area of information security for authentication. Access to computer software applications by their users is controlled through authentication mechanism. Application users define their login credentials such as user-id and password when they first access an application. Users are required to provide the same credentials when they access the same application next time onwards.

Today, it is a common practice that application users define their login credentials in English, irrespective of their native language, though English passwords are very weak compared to those defined in Asian languages. In brute-force attacks, an eight character Chinese password is nearly $1.88 \times 10^{20}$ times stronger than an English password the same length. Chinese language has more than 20,000 symbols including the base radicals and their derivatives. The additional enormous security comes from the large number of Chinese characters and the possible myriad permutations occurring in the selection of eight characters.

Considering all conjunct consonants, their vowel derivatives and modifier combinations, there are nearly 1.8 million characters in Hindi. Therefore, an eight character Hindi password is $8.48 \times 10^{35}$ times stronger than an English password the same length. Passwords defined in other Indian languages except Tamil may be as strong or stronger than a Hindi password. Similarly a Korean password is $3.08 \times 10^{18}$ times as much stronger than an English password. The Japanese Hiragana, Katakana and Kanji character sets together consist of nearly two thousand characters accounting for a security factor of nearly $1.85 \times 10^{12}$ over English passwords. The following Table. A shows calculations supporting the security factors discussed in the two previous paragraphs.

TABLE A

Security Factors for non-English Passwords

| Language | No. of total characters | Permutations for 8 character password | Permutations for 8 character English password | Security factor against brute force attacks |
|---|---|---|---|---|
| Hindi | 1,810,776 (Considering conjunct characters involving any three of 38 consonants, one of 11 vowels and one of 3 modifiers, total characters = 38 * 38 * 38 * 11 * 3 = 1,810,776) | $1.16 \times 10^{50}$ | $1.36 \times 10^{14}$ | $8.48 \times 10^{35}$ (= $1.16 \times 10^{50}$/ $1.36 \times 10^{14}$) |
| Chinese | 20,000 (including all Kangxi radical and their derivative symbols) | $2.56 \times 10^{34}$ | $1.36 \times 10^{14}$ | $1.88 \times 10^{20}$ (= $2.56 \times 10^{34}$/ $1.36 \times 10^{14}$) |

TABLE A-continued

Security Factors for non-English Passwords

| Language | No. of total characters | Permutations for 8 character password | Permutations for 8 character English password | Security factor against brute force attacks |
|---|---|---|---|---|
| Japanese | 2,000 (including Hiragana, Katakana and Kanji Characters) | $2.52 \times 10^{26}$ | $1.36 \times 10^{14}$ | $1.85 \times 10^{12}$ $(= 2.52 \times 10^{26} / 1.36 \times 10^{14})$ |
| Korean | 11,970 (including base consonants and their syllables) | $4.20 \times 10^{32}$ | $1.36 \times 10^{14}$ | $3.08 \times 10^{18}$ $(= 4.20 \times 10^{32} / 1.36 \times 10^{14})$ |

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art

I claim:

1. A method comprising:

displaying on a computer monitor a first plurality of character menu items;

wherein each character menu item of the first plurality of character menu items has only one individually selectable a character of a language;

wherein each character menu item of the first plurality of character menu items is displayed in a first location on the computer monitor;

wherein each character of each character menu item of the first plurality of character menu items is a consonant character of the language;

further comprising receiving a first user selection of a first character menu item of the first plurality of character menu items, wherein the first user selection is received via a computer interactive device;

displaying on the computer monitor during a first state a first overall plurality of character menu items which consists of the first plurality of character menu items, a second plurality of character menu items, and any first further character menu items, so that no character menu items are displayed on the computer monitor during the first state other than the first overall plurality of character menu items, and wherein the second plurality of character menu items is displayed on the computer monitor during the first state in response to the first user selection of the first character menu item;

wherein each character menu item of the second plurality of character menu items has only one individually selectable a character of the language;

wherein each character menu item of the second plurality of character menu items is displayed in a second location on the computer monitor;

wherein each character of each of the second plurality of character menu items is a vowel derivative of the character of the first character menu item;

wherein the second plurality of character menu items is displayed substantially and directly connected to the first character menu item, and the second plurality of character menu items is not displayed substantially and directly connected to any character menu item of the first overall plurality of character menu items, disregarding the second plurality of character menu items themselves, other than the first character menu item, and wherein the second location is separate and apart from the first location and the second location is adjacent the first character menu item;

further comprising receiving a second user selection of a second character menu item of the first plurality of character menu items, wherein the second user selection is received via the computer interactive device;

displaying on the computer monitor during a second state, a second overall plurality of character menu items which consists of the first plurality of character menu items, a third plurality of character menu items, and any second further character menu items, so that no character menu items are displayed on the computer monitor during the second state other than the second overall plurality of character menu items, and wherein the third plurality of character menu items is displayed on the computer monitor during the second state in response to the second user selection of the second character menu item; and wherein each character menu item of the third plurality of character menu items has only one individually selectable a character of the language;

wherein each character of each character menu item of the third plurality of character menu items is a vowel derivative of the character of the second character menu item;

wherein the third plurality of character menu items is displayed substantially and directly connected to the second character menu item, and the third plurality of character menu items is not displayed substantially and directly connected to any character menu item of the second overall plurality of character menu items, disregarding the third plurality of character menu items themselves, other than the second character menu item; and wherein each character menu item of the third plurality of character menu items is displayed in a third location on the computer monitor; and wherein the first, second, and the third locations are separate and apart from each other and the third location is adjacent the second character menu item.

2. The method of claim 1 wherein the second plurality of character menu items is displayed on the computer monitor in a substantially straight line along with the first character menu item in response to the first user selection; and the third plurality of character menu items is displayed on the computer monitor in a substantially straight line along with the second character menu item in response to the second user selection.

3. The method of claim 1 wherein
the first plurality of character menu items is displayed on the computer monitor in a row;
the second plurality of character menu items is displayed on the computer monitor in a column; and
the third plurality of character menu items is displayed on the computer monitor in a column.

4. The method of claim 1 wherein
the language is a non-English language.

5. The method of claim 1 further comprising
receiving a third user selection of a particular character menu item of the first plurality, second plurality, and third plurality of character menu items and causing a character of the particular character menu item to be displayed in a fourth location on the computer monitor;
wherein the fourth location is separate and apart from the first, second, and third locations.

6. The method of claim 1 wherein
each of the character menu items of the first, second, and third plurality of character menu items is any one of an hypertext markup language (html) table cell, a button, and a graphic user interface component; and
the first user selection is received via any one of a computer mouse, finger pad of a computer laptop, computer touch screen, a button, and a computer stylus on a computer mobile device.

7. A method comprising
displaying on a computer monitor a first plurality of character menu items;
wherein each character menu item of the first plurality of character menu items has only one individually selectable character of a language;
wherein each character menu item of the first plurality of character menu items is displayed in a first location on the computer monitor;
further comprising receiving a first user selection of a first character menu item of the first plurality of character menu items, wherein the first user selection is received via a computer interactive device;
displaying on the computer monitor during a first state a first overall plurality of character menu items which consists of the first plurality of character menu items, a second plurality of character menu items, and any first further character menu items, so that no character menu items are displayed on the computer monitor during the first state other than the first overall plurality of character menu items, and wherein the second plurality of character menu items is displayed on the computer monitor during the first state in response to the first user selection of the first character menu item;
wherein each character menu item of the second plurality of character menu items has only one individually selectable character of the language;
wherein the second plurality of character menu items is displayed substantially and directly connected to the first character menu item, and the second plurality of character menu items is not displayed substantially and directly connected to any character menu item of the first overall plurality of character menu items, disregarding the second plurality of character menu items themselves, other than the first character menu item;
wherein each character menu item of the second plurality of character menu items is displayed in a second location on the computer monitor; and wherein the second location is separate and apart from the first location and the second location is adjacent the first character menu item;
further comprising receiving a second user selection of a second character menu item of the second plurality of character menu items, wherein the second user selection is received via the computer interactive device;
displaying on the computer monitor during a second state, a second overall plurality of character menu items which consists of the first plurality of character menu items, the second plurality of character menu items, a third plurality of character menu items, and any second further character menu items, so that no character menu items are displayed on the computer monitor during the second state other than the second overall plurality of character menu items and wherein the third plurality of character menu items is displayed on the computer monitor during the second state in response to the second user selection of the second character menu item;
wherein each character menu item of the third plurality of character menu items has only one individually selectable character of the language;
wherein the third plurality of character menu items is displayed substantially and directly connected to the second character menu item, and the third plurality of character menu items is not displayed substantially and directly connected to any character menu item of the second overall plurality of character menu items, disregarding the third plurality of character menu items themselves, other than the second character menu item;
wherein each character menu item of the third plurality of character menu items is displayed in a third location on the computer monitor; and
wherein the first, second, and the third locations are separate and apart from each other and the third location is adjacent the second character menu item.

8. The method of claim 7 wherein
each of the character menu items of the first plurality of character menu items has any one of a consonant character, a vowel, a base radical, a symbol, a lower case letter, an alphabet name, a digit, a block number, and a punctuation character of the language.

9. The method of claim 7 wherein
the first plurality of character menu items is displayed on the computer monitor in a row;
the second plurality of character menu items is displayed on the computer monitor in a column; and
the third plurality of character menu items is displayed on the computer monitor in a row.

10. The method of claim 9 wherein
the first plurality of character menu items is displayed on the computer monitor in a substantially straight line which includes the first character menu item but not the second character menu item;
the second plurality of character menu items is displayed on the computer monitor in response to the first user selection in a substantially straight line which includes the first character menu item and the second character menu item; and
the third plurality of character menu items is displayed on the computer monitor in response to the second user selection in a substantially straight line which includes the second character menu item but not the first character menu item.

11. The method of claim 7 wherein
the language is a non-English language.

12. The method of claim 7 further comprising
receiving a third user selection of a particular character menu item of the first plurality, second plurality, and third plurality of character menu items and causing a character of the particular character menu item to be displayed in a fourth location on the computer monitor;
wherein the fourth location is separate and apart from the first, second, and third locations.

13. The method of claim 12 further comprising
searching on the internet using the character of the particular character menu item.

14. The method of claim 7 further comprising
receiving a third user selection of a third character menu item of the third plurality of character menu items, wherein the third user selection is received via a computer interactive device; and
in response to the third user selection, displaying on the computer monitor a fourth plurality of character menu items, wherein the character menu items of the fourth plurality of character menu items are related to the third character menu item;
wherein each character menu item of the fourth plurality of character menu items has a character of the language;
wherein each character menu item of the fourth plurality of character menu items is displayed in a fourth location on the computer monitor; and
wherein the first, second, third, and fourth locations are separate and apart from each other and the fourth location is adjacent the third character menu item.

15. The method of claim 14 further comprising
receiving a fourth user selection of a particular character menu item of the first plurality, second plurality, third plurality, and fourth plurality of character menu items and causing a character of the particular character menu item to be displayed in a fifth location on the computer monitor;
wherein the fifth location is separate and apart from the first, second, third, and fourth locations.

16. The method of claim 14 wherein
the first plurality of character menu items is displayed in a row in the first location of the computer monitor;
the second plurality of character menu items is displayed in any one of a column, a row, and a block in the second location of the computer monitor;
the third plurality of character menu items is displayed in any one of a column, a row, and a block in the third location of the computer monitor; and
the fourth plurality of character menu items is displayed in any one of a column, a row, and a block in the third fourth location of the computer monitor.

17. The method of claim 7 wherein
the first user selection is received from any one of a computer mouse, a computer touch screen, a finger pad of a laptop computer, and a computer keyboard.

18. The method of claim 7 wherein
each character of each character menu item of the first plurality of character menu items is a consonant character of the language;
wherein each character of each of the second plurality of character menu items is a vowel derivative of the character of the first character menu item; and
wherein each character of each of the third plurality of character menu items is a double-consonant conjunct derivative of the character of the second character menu item.

19. The method of claim 7 wherein
the first plurality of character menu items is displayed in a row in the first location of the computer monitor;
the second plurality of character menu items is displayed in any one of a column, a row, and a block in the second location of the computer monitor; and
the third plurality of character menu items is displayed in any one of a column, a row, and a block in the third location of the computer monitor.

* * * * *